(12) United States Patent
Kameyama et al.

(10) Patent No.: US 11,573,134 B2
(45) Date of Patent: Feb. 7, 2023

(54) SEMICONDUCTOR DEVICE AND TEST METHOD OF SEMICONDUCTOR DEVICE

(71) Applicant: RENESAS ELECTRONICS CORPORATION, Tokyo (JP)

(72) Inventors: Tadashi Kameyama, Tokyo (JP); Masanori Ikeda, Tokyo (JP)

(73) Assignee: RENESAS ELECTRONICS CORPORATION, Tokyo (JP)

(*) Notice: Subject to any disclaimer, the term of this patent is extended or adjusted under 35 U.S.C. 154(b) by 630 days.

(21) Appl. No.: 16/687,308

(22) Filed: Nov. 18, 2019

(65) Prior Publication Data

US 2020/0209075 A1 Jul. 2, 2020

(30) Foreign Application Priority Data

Dec. 27, 2018 (JP) ............................... JP2018-244354

(51) Int. Cl.
*G01K 7/01* (2006.01)
*G01K 15/00* (2006.01)
*G06F 1/20* (2006.01)

(52) U.S. Cl.
CPC ............. *G01K 15/007* (2013.01); *G01K 7/01* (2013.01); *G06F 1/206* (2013.01)

(58) Field of Classification Search
CPC .......... G01K 15/007; G01K 7/01; G01K 7/00; G01K 13/00; G01K 15/00; G01K 2217/00; G01K 2219/00; G06F 1/206
See application file for complete search history.

(56) References Cited

U.S. PATENT DOCUMENTS

| 5,619,430 A * | 4/1997 | Nolan ................. H02J 7/00047 |
| | | 320/150 |
| 10,768,057 B2 * | 9/2020 | Turullols .............. G01K 15/005 |
| 2014/0314124 A1 * | 10/2014 | Ash .......................... G01K 7/01 |
| | | 374/183 |

(Continued)

FOREIGN PATENT DOCUMENTS

| EP | 3683559 B1 * | 8/2021 | ............. G01K 13/00 |
| JP | 2017-198523 A | 11/2017 | |

*Primary Examiner* — Gail Kaplan Verbitsky
(74) *Attorney, Agent, or Firm* — McDermott Will & Emery LLP

(57) ABSTRACT

A semiconductor device includes a first temperature sensor module, a second temperature sensor module, a first temperature controller, and a second temperature controller. The first temperature sensor module includes a bandgap reference circuit that outputs a plurality of divided voltages, and a first conversion circuit that performs analog-to-digital conversion processing on one of the plurality of divided voltages to generate a first digital value. The second temperature sensor module includes a second conversion circuit that performs analog-to-digital conversion processing on the one of the plurality of divided voltages to generate a second digital value. The first temperature sensor controller converts the first digital value to a first temperature. The second temperature sensor controller converts the second digital value to a second temperature. The semiconductor device determines whether the first and second temperature modules operate normally based on a difference between the first temperature and the second temperature.

10 Claims, 19 Drawing Sheets

(56) References Cited

U.S. PATENT DOCUMENTS

| | | | |
|---|---|---|---|
| 2015/0130531 A1* | 5/2015 | Tadinada | G05F 5/00 |
| | | | 438/54 |
| 2016/0047696 A1* | 2/2016 | Ramaraju | G01K 7/01 |
| | | | 374/170 |
| 2017/0082500 A1* | 3/2017 | Ramachandran | G01K 7/01 |
| 2017/0315001 A1* | 11/2017 | Ikeda | G01K 15/005 |
| 2018/0045579 A1* | 2/2018 | Saeedi | H01L 35/32 |
| 2018/0073933 A1* | 3/2018 | Keskin | G06F 1/206 |
| 2018/0283964 A1* | 10/2018 | Turullols | G01K 7/01 |
| 2019/0161341 A1* | 5/2019 | Howe | B81C 1/00301 |
| 2020/0135697 A1* | 4/2020 | Brewer | H01L 25/0657 |

* cited by examiner

SEMICONDUCTOR DEVICE AND TEST METHOD OF SEMICONDUCTOR DEVICE

CROSS-REFERENCE TO RELATED APPLICATIONS

The disclosure of Japanese Patent Application No. 2018-244354 filed on Dec. 27, 2018 including the specification, drawings and abstract is incorporated herein by reference in its entirety.

BACKGROUND

The present disclosure relates to a semiconductor device, and more particularly to temperature measurement in a semiconductor device.

As in-vehicle electronic systems, various information processing devices are mounted on vehicles. The information processing device provides a navigation function, an audio function, etc. A semiconductor device used in the information processing device has a function of monitoring temperature inside the semiconductor device in order to realize high speed processing.

Concerning monitoring of temperature, for example, Japanese unexamined Patent Application publication No. 2017-198523 discloses "a semiconductor device capable of measuring temperature and power supply voltage with high accuracy". The semiconductor device includes "a temperature sensor module 10 that outputs a non-linear digital value with respect to temperature and a substantially linear sensor voltage value with respect to the temperature, a storage unit 30 that stores the temperature, the digital value, and the sensor voltage value, and a controller 40 that calculates a characteristic formula using the temperature, the digital value, and the sensor voltage value stored in the storage unit 30, in which the temperature, the digital value, and the sensor voltage value stored in the storage unit 30 include absolute temperature under measurement of absolute temperature, the digital value at the absolute temperature, and the sensor voltage value at the absolute temperature" (see "ABSTRACT").

SUMMARY

In in-vehicle electronic systems compliant with International Standard Organization (ISO) 26262, high safety is required for semiconductor devices mounted on vehicles. Regarding the safety of the in-vehicle electronic systems, levels A to D are specified as Automotive Safety Integrity Level (ASIL), and the highest safety is required in ASIL D. Therefore, there is a need for a semiconductor device that meets ASIL D.

A semiconductor device mounted on a vehicle may include a plurality of temperature sensor modules. To address functional safety for such a semiconductor device, in a situation where the temperature (junction temperature, hereinafter also referred to as temperature Tj) of the semiconductor device to be measured by each temperature sensor module is unknown, it is required to test that the temperature Tj can be correctly measured. In one aspect, it has been thought that this test method requires that the temperature be measured correctly by a function other than the function of the temperature sensor module to be tested, and that the measured value be compared with the measured value of the temperature Tj obtained by the temperature sensor module to be tested. In this instance, even if the plurality of temperature sensor modules are mounted on the semiconductor device, since the temperatures Tj at locations where temperature sensor modules are disposed is different from each other, it is not known whether or not the temperature is correctly measured even if the measured values of the temperatures Tj of the temperature sensor modules are compared with each other. In normal use environments of the semiconductor device, the temperature Tj is obtained only at that time, and therefore it is not possible to test whether the temperature can be correctly measured in a temperature range from a lower limit temperature (e.g., −40° C.) to an upper limit temperature (e.g., 125° C.) at which an operation of the semiconductor device is guaranteed.

Therefore, there is a need for a technique for testing whether the temperature of the semiconductor device can be correctly measured from the lower limit temperature to the upper limit temperature at which the operation of the semiconductor device is guaranteed.

Other objects and new features will be apparent from the description of this specification and the accompanying drawings.

According to one embodiment, a semiconductor device includes a first temperature sensor module, a second temperature sensor module, a first temperature controller, and a second temperature controller. The first temperature sensor module includes a bandgap reference circuit that outputs a plurality of divided voltages, and a first conversion circuit that performs analog-to-digital conversion processing on one of the plurality of divided voltages to generate a first digital value. The second temperature sensor module includes a second conversion circuit that performs analog-to-digital conversion processing on the one of the plurality of divided voltages to generate a second digital value. The first temperature sensor controller converts the first digital value to a first temperature. The second temperature sensor controller converts the second digital value to a second temperature. The semiconductor device determines whether the first and second temperature modules operate normally based on a difference between the first temperature and the second temperature.

According to one embodiment, it is possible to test whether temperature of a semiconductor device is correctly measured within a range from a lower limit temperature to an upper limit temperature at which an operation of the semiconductor device is guaranteed.

DETAILED DESCRIPTION

Figure 1A:
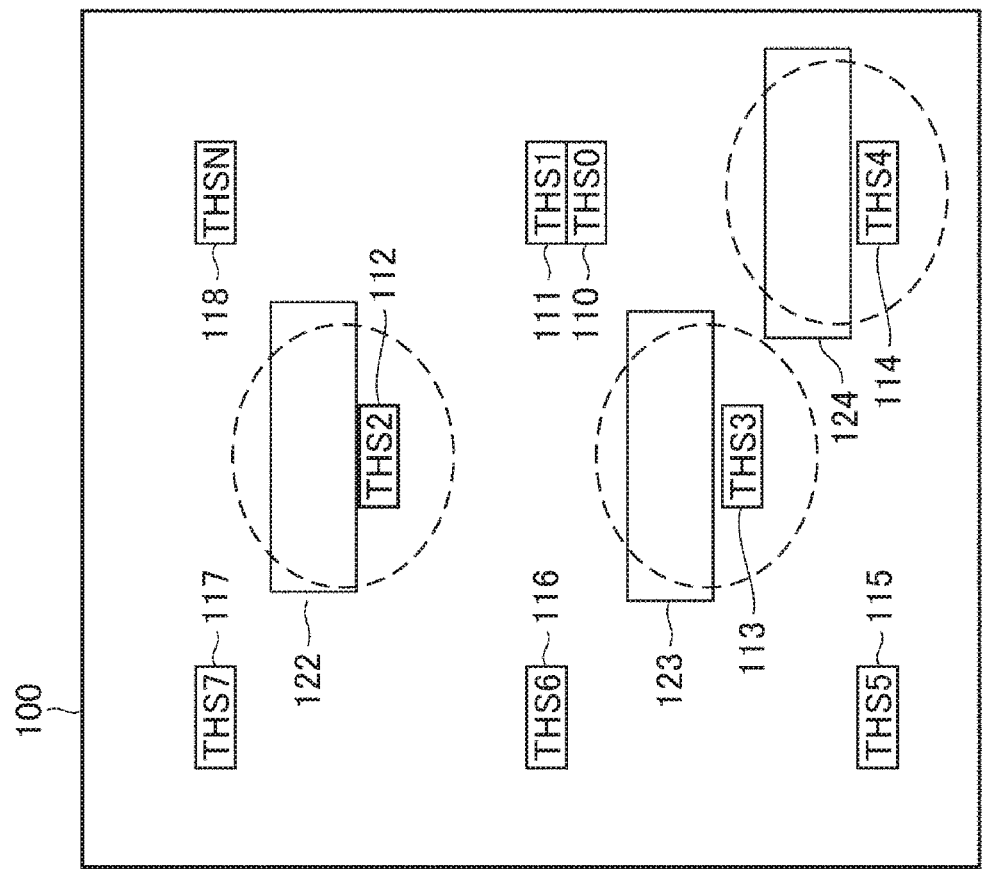
FIG. 1A is a diagram showing an example in which a plurality of temperature sensor modules is disposed in a semiconductor device 100.

Embodiments of technical ideas disclosed in this specification will be described below with reference to the drawings. In the following description, the same components are denoted by the same reference numerals. Their names and functions are also the same. Therefore, detailed description thereof may not be repeated.

First Embodiment

Referring to FIG. 1, heat generation in a semiconductor device 100 according to a first embodiment will be described. FIG. 1A is a diagram showing an example in which a plurality of temperature (thermal) sensor modules (hereinafter, also referred to as "THSs") are disposed in the semiconductor device 100.

As shown in FIG. 1A, the semiconductor device 100 includes temperature sensor modules 110-118. The temperature sensor modules 112 and 113 are disposed in the vicinity of modules 122 and 123 which generate a large amount of heat, such as a Central Processing Unit (CPU) and a Graphics Processing Unit (GPU), for example. The temperature sensor module 114 is disposed in the vicinity of a module 124 whose characteristics need to be adjusted in accordance with temperature.

Figure 1B:
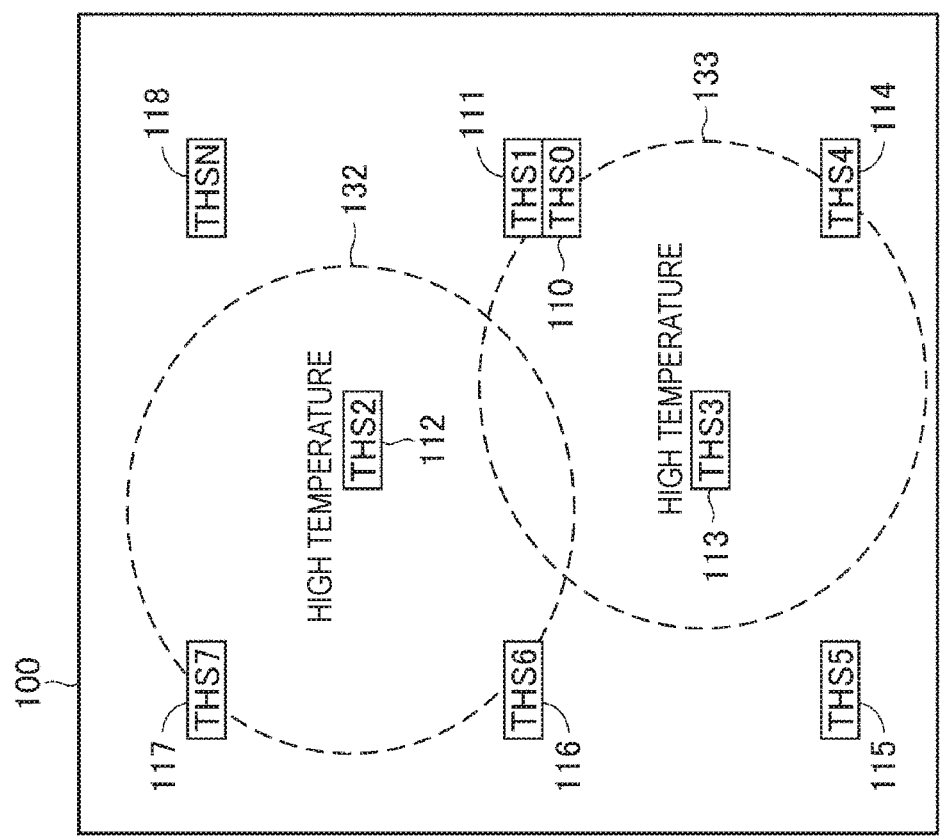
FIG. 1B is a diagram showing an example in which a plurality of temperature sensor modules is disposed in a semiconductor device 100.

FIG. 1B shows that positions where the temperature sensor modules 112 and 113 are disposed are places where heat is most intensely generated (local heat generation) in the semiconductor device 100. For example, a region 132 shows a range in which heat generated by the module 122 affects. A region 133 shows a range in which heat generated by the module 123 affects. As shown in FIG. 1B, inside the semiconductor device 100, the distribution of heat generation in the semiconductor device differs depending on a position where a module with a large amount of heat generation, such as CPUs and GPUs, is disposed, and depending on operating conditions of the module.

Figure 2:
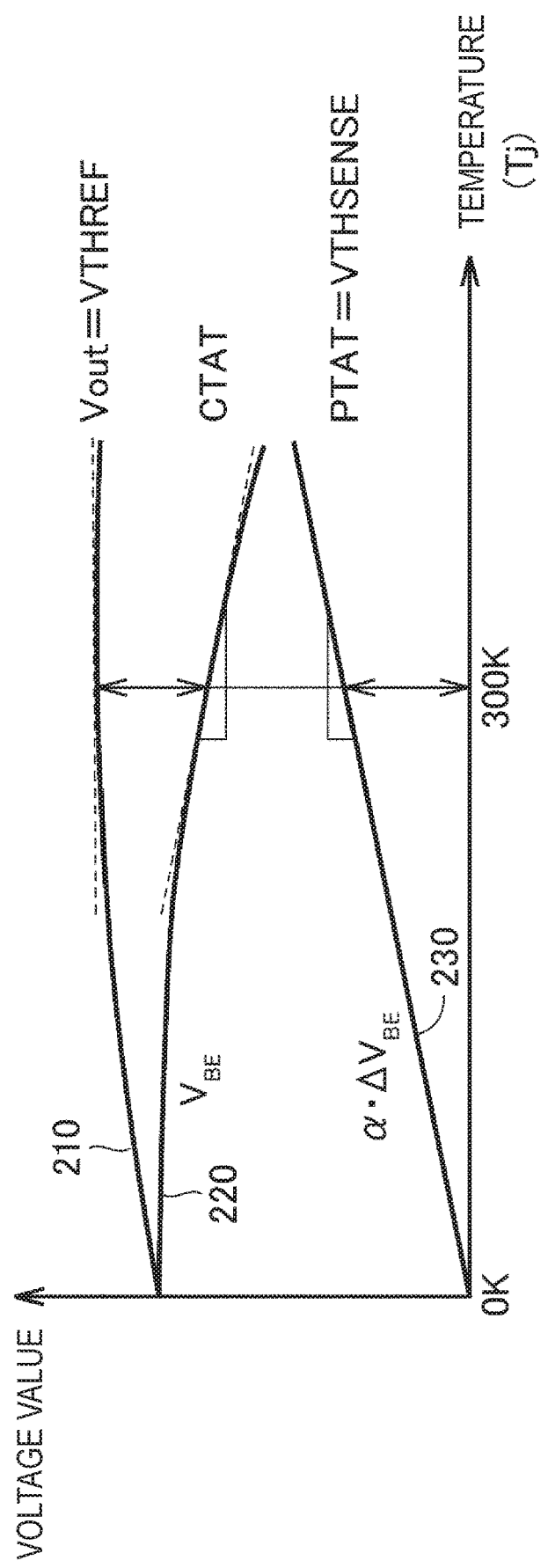
FIG. 2 is a diagram showing electrical characteristics of a bandgap reference circuit.

FIG. 2 is a diagram showing electrical characteristics of a bandgap reference circuit (hereinafter also referred to as a "BGR circuit"). The BGR circuit generates a reference voltage VTHREF as shown in a graph 210. The reference voltage VTHREF is generated by summing two voltages with temperature coefficients of opposite sign with appropriate multiplier constants, and is independent of temperature. In the BGR circuit, since the output level is determined from GND, the output level has a very low dependence on VDD (power supply voltage) for driving the BGR circuit.

The reference voltage VTHREF is a constant voltage (about 1.24V) that is hardly affected by variations in the power supply of the BGR circuit or changes in temperatures of the BGR circuit. The BGR circuit generates a voltage, shown as a graph 220, which is complementary to the absolute temperature (Complementary To Absolute Temperature (CTAT) voltage, hereinafter referred to as "CTAT voltage"), and a voltage, shown as a graph 230, which has a first-order positive characteristic with respect to the temperature Tj (Proportional To Absolute Temperature (PTAT) voltage, hereinafter also referred to as "PTAT voltage VTHSENSE"). The BGR circuit combines the PTAT voltage and the CTAT voltage to generate a voltage Vout.

Figure 3:
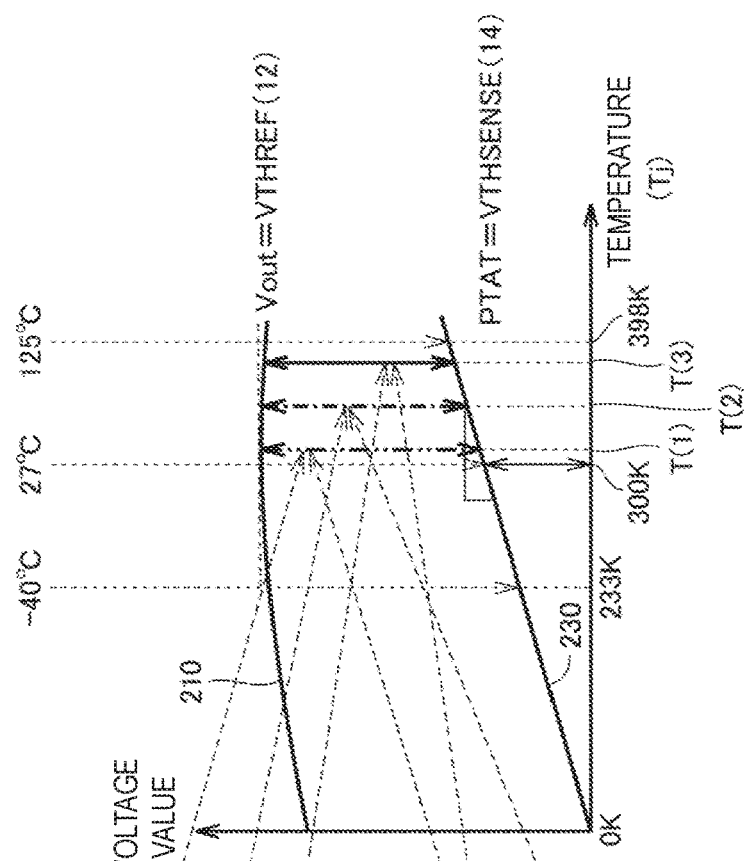
FIG. 3 is a diagram explaining a relationship between local heat generation in the semiconductor device 100, and a reference voltage VTHREF and a PTAT voltage VTHSENSE.
Figure 3:
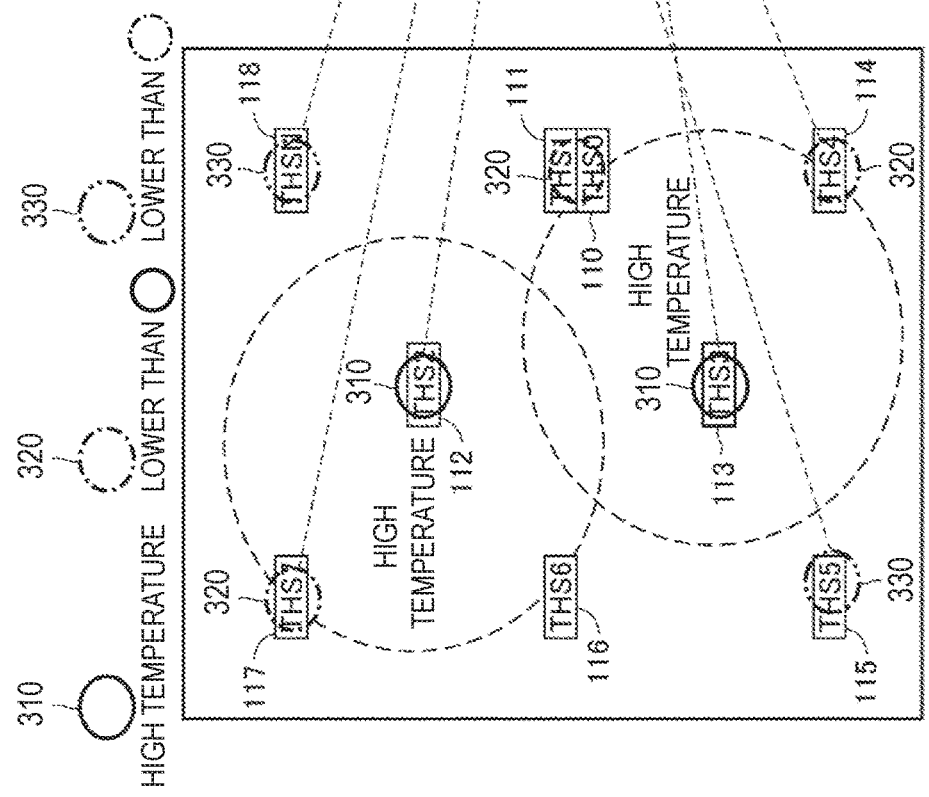

Referring to FIG. 3, a relationship between the local heat generation in the semiconductor device 100, and the reference voltage VTHREF and the PTAT voltage VTHSENSE will be described. The left side of FIG. 3 shows heat generation places in the same manner as FIG. 1A. A circle 310 attached to the temperature sensor modules 112 and 113 indicates that high temperature heat is generated. A circle 320 attached to the temperature sensor modules 110, 111, 114 and 117 indicates that heat is generated at a temperature lower than that at the place indicated by the circle 310. A circle 330 attached to the temperature sensor modules 115 and 118 indicates that heat is generated at a temperature lower than that at the place indicated by the circle 320.

The Right side of FIG. 3 is a diagram showing the temperature Tj distribution of the heat generation places indicated by using the electrical characteristics of the BGR circuit. In one aspect, a temperature range in which an operation of the semiconductor device 100 is guaranteed is, for example, −40° C. to 125° C. The temperature sensor modules 115 and 118 associated with the circle 330, for example, detect a temperature T(1). Temperature sensor modules 110, 111, 114 and 117 associated with circle 320 detect, for example, a temperature T(2). The temperature sensor module 112 and 113 associated with the circle 310 detects, for example, a temperature T(3).

[Configuration of Semiconductor Device 400]

Figure 4:
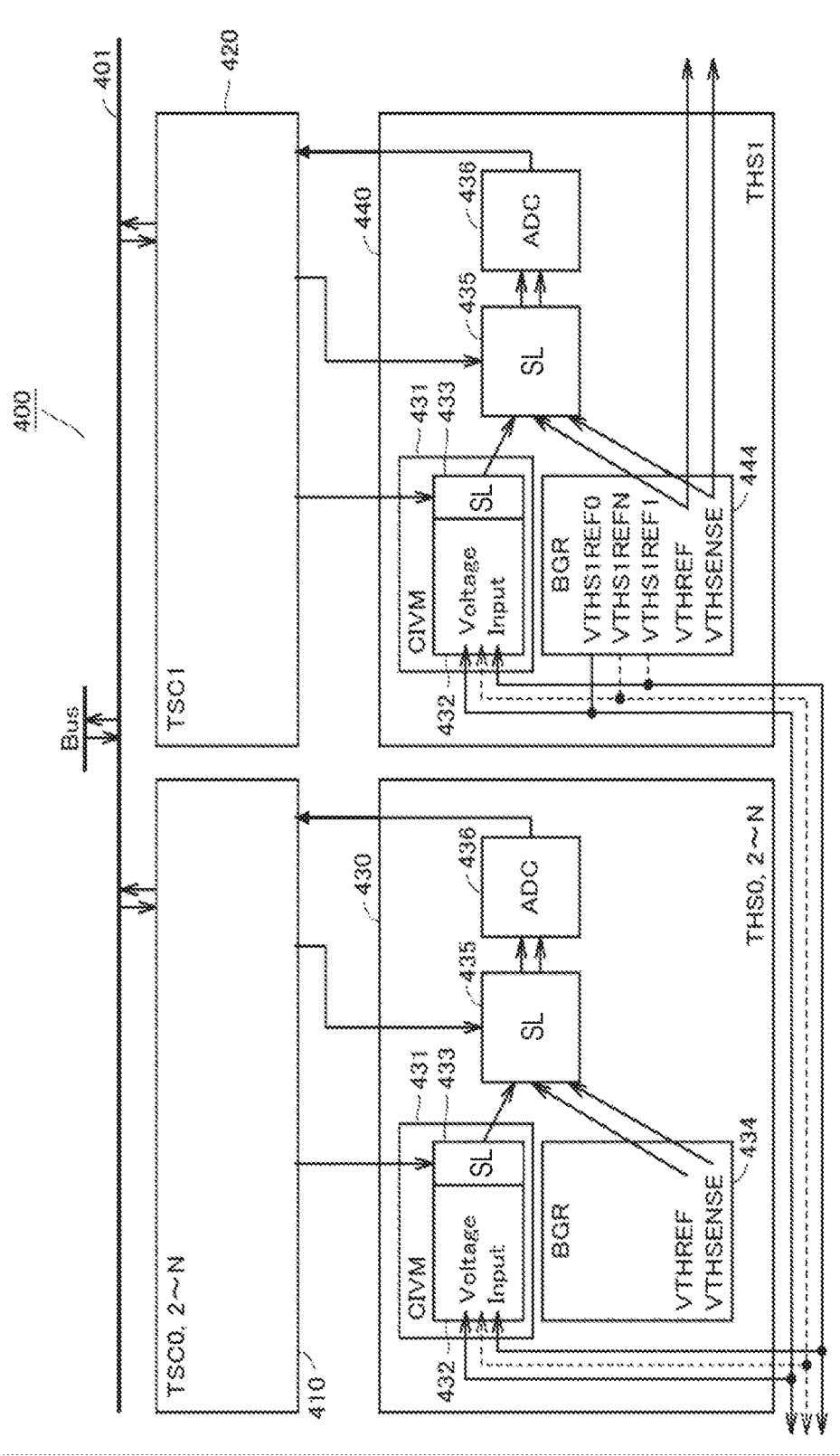
FIG. 4 is a diagram showing a hardware configuration of a semiconductor device 400.

Referring to FIG. 4, a configuration of a semiconductor device 400 according to the first embodiment will be described. FIG. 4 is a block diagram showing a hardware configuration of the semiconductor device 400. The semiconductor device 400 includes N+1 temperature sensor controllers (TSC0 to TSCN) and N+1 temperature sensor modules (THS0 to THSN). In one aspect, the N temperature sensor controllers (TSC0 and TSC2 to TSCN) control the N temperature sensor modules (THS0 and THS2 to THSN), respectively. Hereinafter, the N temperature sensor controllers (TSC0 and TSC2 to TSCN) controllers are collectively referred to as a temperature sensor controller 410. The N temperature sensor modules (THS0 and THS2 to THSN) are collectively referred to as a temperature sensor module 430. The temperature sensor controller (TSC1) other than the N temperature sensor controllers (TSC0 and TSC2 to TSCN) is referred to as a temperature sensor controller 420. The temperature sensor module (THS1) other than the N temperature sensor modules (THS0 and THS2 to THSN) are referred to as a temperature sensor module 440.

The temperature sensor controllers 410 and 420 exchange data with the temperature sensor modules 430 and 440, respectively, and output signals to control the operation of the temperature sensor modules.

The temperature sensor controller 410 outputs a Chip Internal Voltage Monitor (CIVM) select signal to the temperature sensor module 430. The CIVM select signal is input to a CIVM circuit 431. The CIVM select signal specifies a voltage value to be selected from among a plurality of voltage values described later.

The CIVM circuit 431 includes a voltage input unit 432 and a selector (selecting circuit) 433. The voltage input unit 432 receives voltage values VTHS1REF0 to VTHS1REFN (divided voltage values) obtained by dividing a reference voltage generated by a BGR circuit 444 of the temperature sensor module 440. The selector (SL) 433 selects one of the voltage values based on the CIVM select signal, and supplies the selected voltage value to a selector (SL) 435. The CIVM select signal includes information indicating which voltage value specified according to control of the temperature sensor controller 410 is to be selected.

A reference voltage VTHREF and a PTAT voltage VTHSENSE output from a BGR circuit 434 are also input to the selector 435. The selector 435 selects two voltage values from the voltage value input from the CIVM circuit 431, and the reference voltage and the PTAT voltage input from the BGR circuit 434 based on the CIVM select signal. The selected voltages are input to an analog-to-digital converter (analog-to-digital conversion circuit) 436. The Analog-to-Digital Converter (ADC) 436 performs, based on one voltage value of the two voltage values, Analog-to-Digital (AD) conversion processing on the other voltage value. For example, in one aspect, the ADC 436 performs the AD conversion processing on the PTAT Voltage VTHSENSE based on the reference voltage VTHREF. A digital value obtained by the AD conversion processing is input to the temperature sensor controller 410.

Similar to the temperature sensor controller 410, the temperature sensor controller 420 communicates data with the temperature sensor module 440, and controls the temperature sensor module 440. In the temperature sensor module 440, the BGR circuit 444 generates the N+1 voltage values VTHS1REF0, VTHS1REF1, . . . and VTHS1REFN, and outputs the voltage values to the temperature sensor module 430 other than the temperature sensor module 440. In addition, the BGR circuit 444 generates the reference voltage VTHREF and the PTAT voltage VTHSENSE, and outputs them to the selector 435, respectively.

[Normal Operation]

Figure 5:
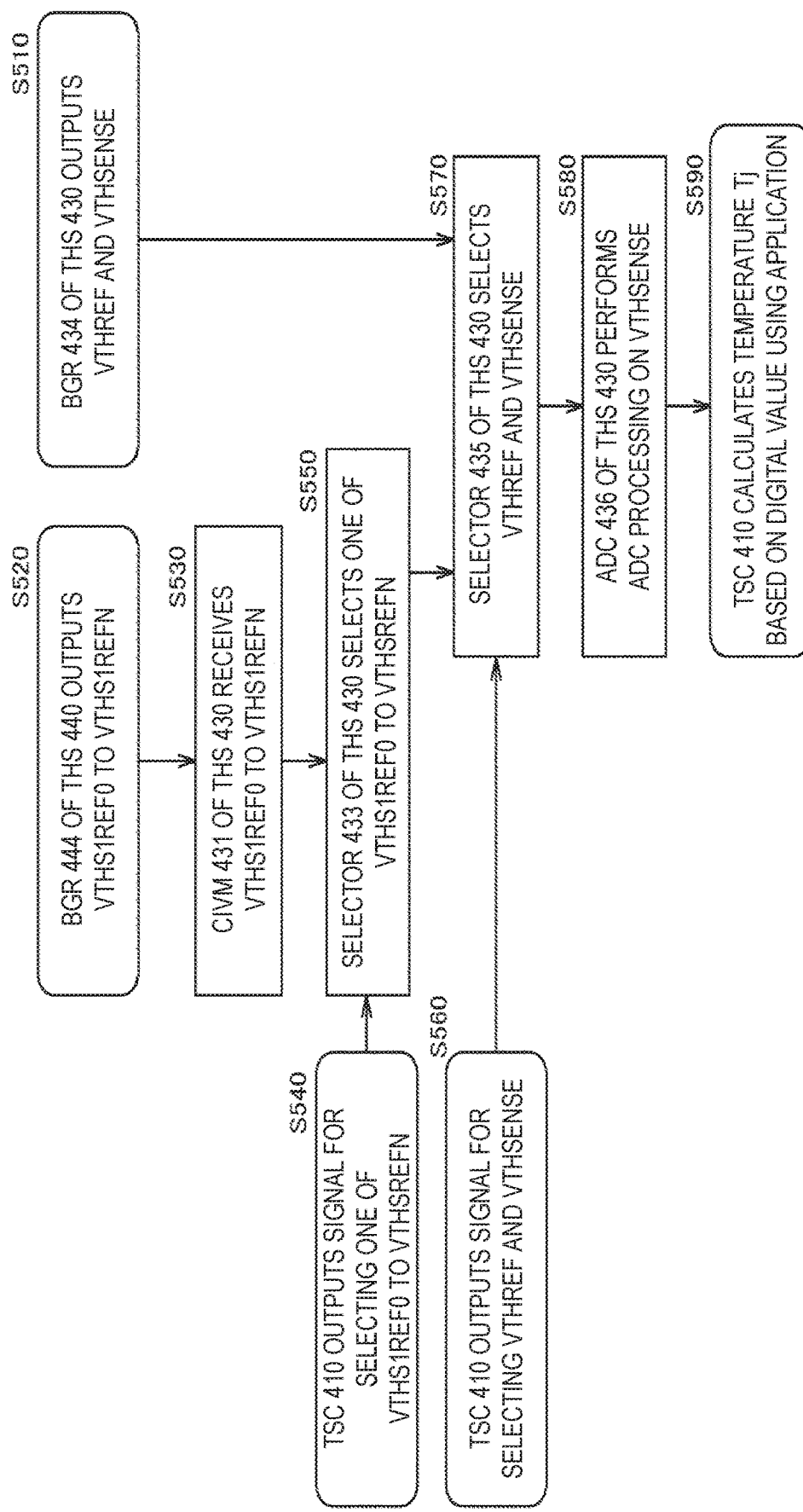
FIG. 5 is a flowchart showing a part of processing performed by the semiconductor device 400.

Referring to FIG. 5, a flow of measuring the temperature Tj during normal operation of the temperature sensor module will be described. FIG. 5 is a flowchart showing a part of processing performed by the semiconductor device 400.

A step S510, the BGR circuit 434 of the temperature sensor module 430 generates the reference voltage VTHREF and the PTAT voltage VTHSENSE (detection voltage depending on temperature), and outputs them to the selector 435.

In a step S520, the BGR circuit 444 of the temperature sensor module 440 generates the voltage values VTHS1REF0 to VTHS1REFN, and outputs them to the temperature sensor module 430. In a step S530, the CIVM circuit 431 of the temperature sensor module 430 receives the reference voltages (voltage values VTHS1REF0 to VTHS1REFN) at the voltage input unit 432.

In a step S540, the temperature sensor controller 410 outputs, to the temperature sensor module 430, a signal for selecting one of the voltage values VTHS1REF0 to VTHSREFN obtained by dividing the reference voltage VTHREF. In a step S550, the selector 433 of the CIVM circuit 431 included in the temperature sensor module 430 selects one of the voltage values VTHS1REF0 to VTHSREFN based on the signal received from the temperature sensor controller 410.

In a step S560, the temperature sensor controller 410 outputs a signal for selecting the reference voltage VTHREF and the PTAT voltage VTHSENSE to the temperature sensor module 430. In a step S570, the selector 435 of the temperature sensor module 430 selects the reference voltage VTHREF and the PTAT voltage VTHSENSE. In a step S580, the ADC 436 of the temperature sensor module 430 performs the AD conversion processing on the PTAT voltage VTHSENSE based on the selected reference voltage VTHREF, and outputs the obtained digital value to the temperature sensor controller 410.

In a step S590, the temperature sensor controller 410 calculates the temperature Tj based on the digital value using an application program.

[Test Operation]

Figure 6:
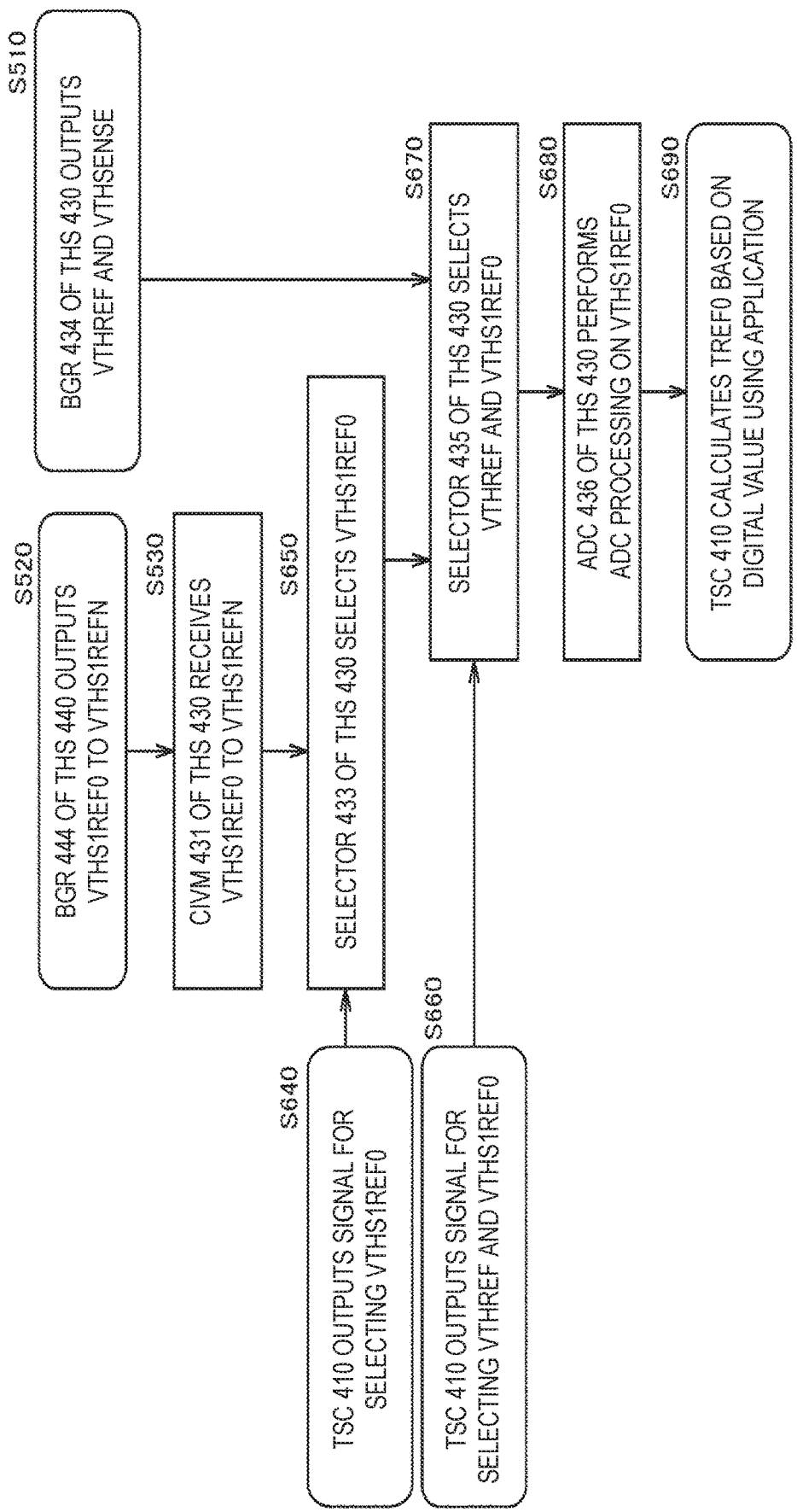
FIG. 6 is a flowchart showing a part of processing of another test of a temperature sensor module.

FIG. 6 is a flowchart showing a part of processing of another test of the temperature sensor module. The same processing as that described above is denoted by the same step number. Therefore, the description of the same processing may not be repeated.

In a step S640, the temperature sensor controller 410 outputs a signal for selecting the voltage values VTHS1REF0 to the temperature sensor module 430. In step S650, the selector 433 of the CIVM circuit 431 included in the temperature sensor module 430 selects the voltage values VTHS1REF0 based on the signals received from the temperature sensor controller 410.

In a step S660, the temperature sensor controller 410 outputs a signal for selecting the reference voltage VTHREF and the voltage value VTHS1REF0 to the temperature sensor module 430. In a step S670, the selector 435 of the temperature sensor module 430 selects the reference voltage VTHREF and the voltage value VTHS1REF0. In a step S680, the ADC 436 of the temperature sensor module 430 performs the AD conversion processing on the voltage value VTHS1REF0 based on the selected reference voltage VTHREF, and outputs the obtained digital value to the temperature sensor controller 410.

In a step S690, the temperature sensor controller 410 converts the digital value into the temperature Tj using the application program, and calculates a temperature conversion value (TREF0) in case of an upper limit temperature (for example, 125° C.) in a range in which an operation of the semiconductor device 400 is guaranteed.

Although each BGR circuit 434 has individual differences in characteristics, the semiconductor device 400 can determine that each of the temperature sensor modules can correctly measure the temperature Tj by confirming that the temperature conversion values TREF0 of the temperature sensor modules substantially coincide with each other. In one aspect, substantially coinciding means that the difference between the respective temperature conversion values TREF0 is within a preset range, and the respective temperature conversion values TREF0 do not necessarily have to be the same.

Figure 7:
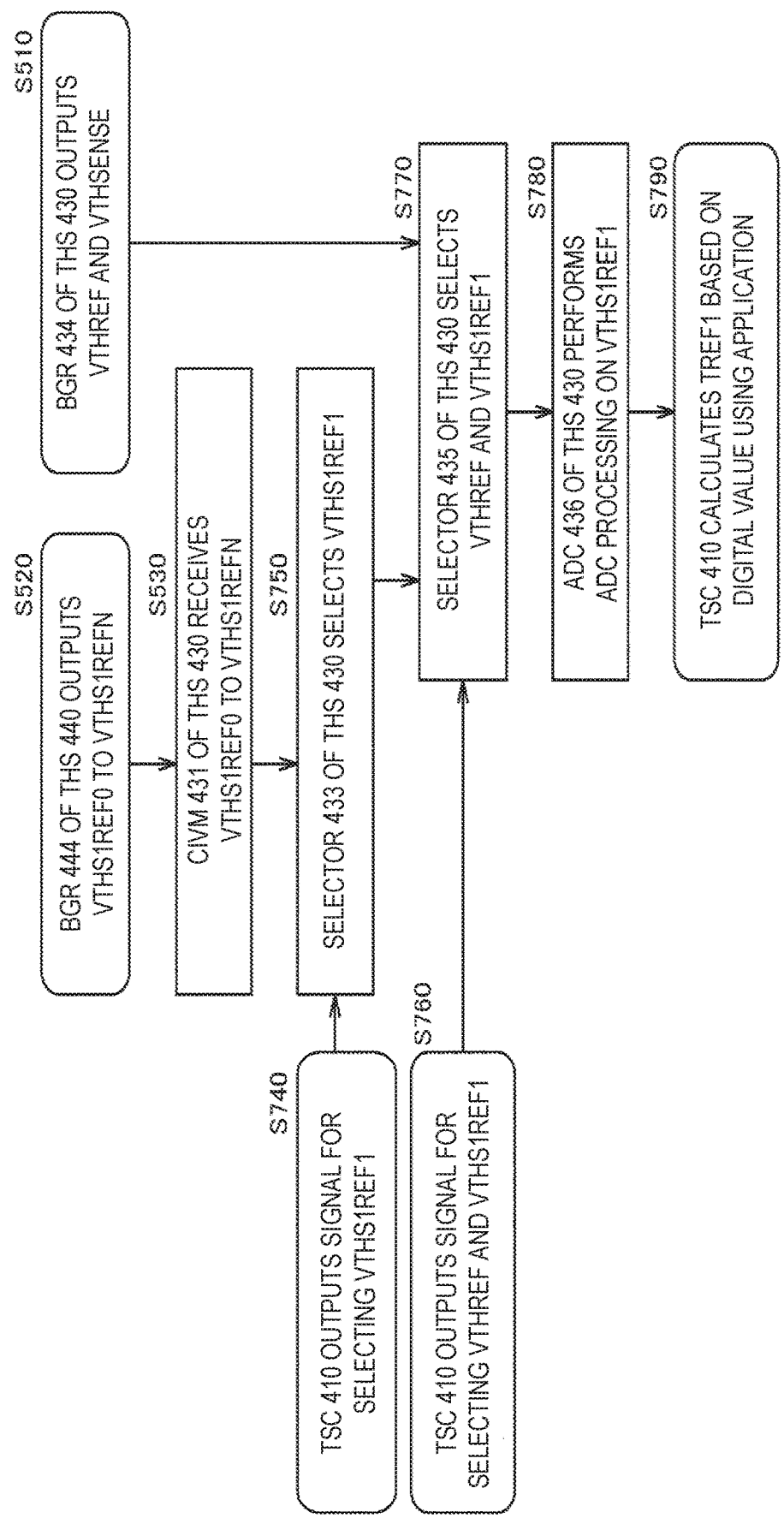
FIG. 7 is a flowchart showing a part of processing of yet another test of the temperature sensor module.

FIG. 7 is a flowchart showing a part of processing of yet another test of the temperature sensor module. The same processing as that described above is denoted by the same step number. Therefore, the description of the same processing may not be repeated.

In a step S740, the temperature sensor controller 410 outputs, to the temperature sensor module 430, a signal for selecting a voltage value VTHS1REF1 corresponding to a lower limit temperature (e.g., −40° C.) in the range in which the operation of the semiconductor device 400 is guaranteed.

In a step S750, the selector 433 of the CIVM circuit 431 included in the temperature sensor module 430 selects the voltage value VTHS1REF1 based on the signal received from the temperature sensor controller 410.

In a step S760, the temperature sensor controller 410 outputs a signal for selecting the reference voltage VTHREF and the voltage value VTHS1REF1 to the temperature sensor module 430.

In a step S770, the selector 435 of the temperature sensor module 430 selects the reference voltage VTHREF and the voltage value VTHS1REF1.

In a step S780, the ADC 436 of the temperature sensor module 430 performs the AD conversion processing on the voltage value VTHS1REF1 based on the selected reference voltage VTHREF, and outputs the obtained digital value to the temperature sensor controller 410.

In a step S790, the temperature sensor controller 410 converts the digital value into the temperature Tj using the application program, and calculates a temperature conversion value TREF1 corresponding to the lower limit temperature in the range in which the operation of the semiconductor device 400 is guaranteed.

Although each BGR circuit 434 has individual differences in characteristics, it can be determined that each of the temperature sensor modules can correctly measure the temperature Tj by confirming that the temperature conversion values TREF1 of the temperature sensor modules substantially coincide with each other. In one aspect, substantially coinciding means that the difference between the respective temperature conversion values TREF1 is within a preset range, and the respective temperature conversion values TREF1 do not necessarily have to be the same.

Figure 8:
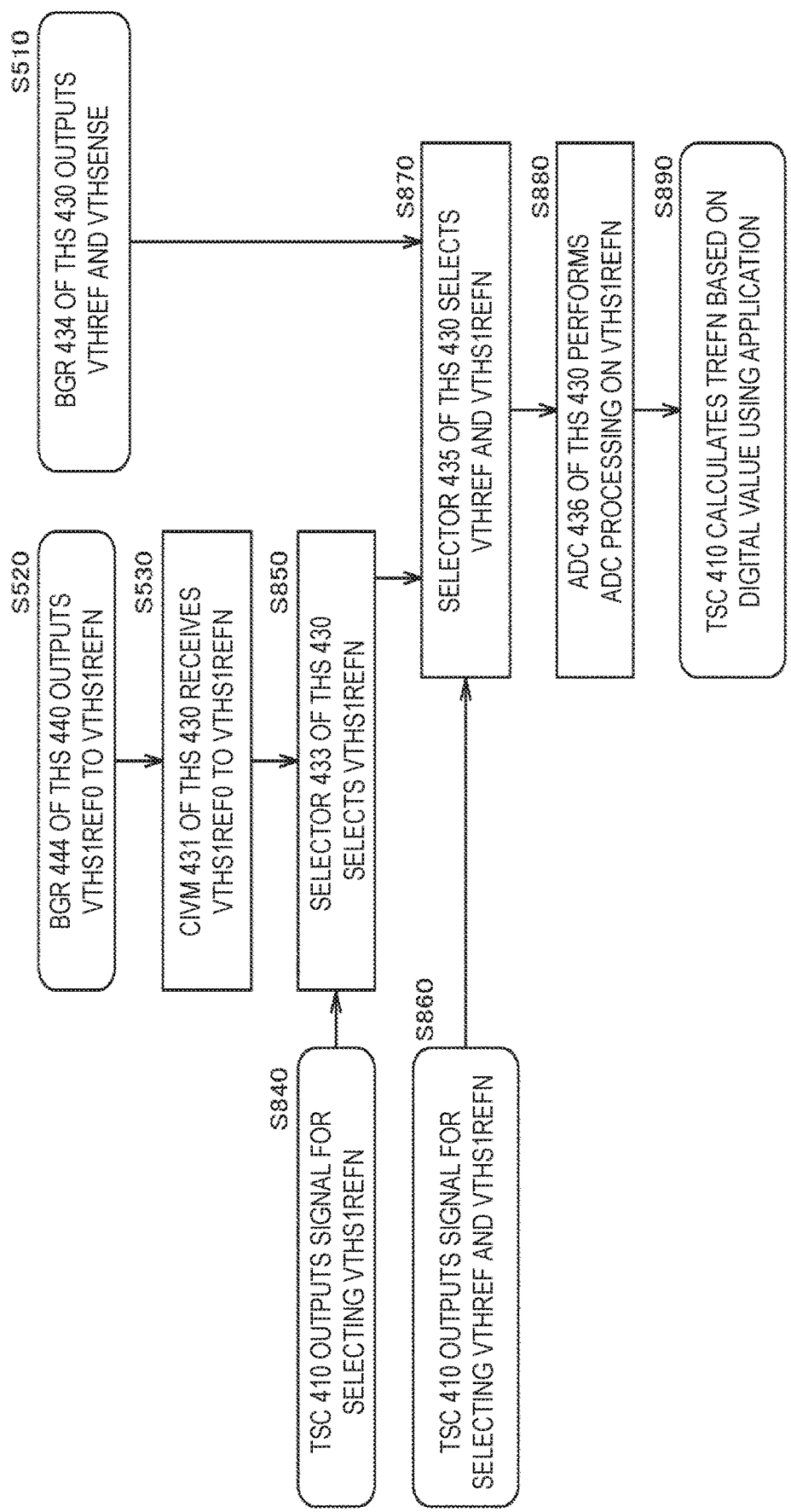
FIG. 8 is a flowchart showing a part of processing performed by the semiconductor device 400 according to another aspect.

Yet another aspect will be described with reference to FIG. 8. FIG. 8 is a flowchart showing a part of processing performed by the semiconductor device 400 according to another aspect. The same processing as that described above is denoted by the same step number. Therefore, the description of the same processing may not be repeated.

In a step S840, the temperature sensor controller 410 outputs a signal for selecting the voltage value VTHS1REFN to the temperature sensor module 430. The voltage value VTHS1REFN is a voltage value corresponding to any of the temperatures included in the above-mentioned range in which the operation of the semiconductor device 400 is guaranteed (−40° C. to 125° C.)

In a step S850, the selector 433 of the CIVM circuit 431 included in the temperature sensor module 430 selects the voltage value VTHS1REFN based on the signal received from the temperature sensor controller 410 in response to the reception of the signal.

In a step S860, the temperature sensor controller 410 outputs, to the temperature sensor module 430, a signal for selecting the reference voltage VTHREF and the voltage value VTHS1REFN.

In a step S870, the selector 435 of the temperature sensor module 430 selects the reference voltage VTHREF and the voltage value VTHS1REFN in response to the reception of the signal.

In a step S880, the ADC 436 of the temperature sensor module 430 performs the AD conversion processing on the voltage value VTHS1REFN based on the selected reference voltage VTHREF, and outputs the obtained digital value to the temperature sensor controller 410.

In a step S890, the temperature sensor controller 410 converts the obtained digital value into a temperature conversion value TREFN using the application program. The application program according to the present embodiment implements the processing of converting the voltage value to temperature using preset relationships for converting the voltage value to temperature. The preset relationship is defined, for example, by a graph illustrated in FIG. 3 or FIG. 10 described later, or as a table representing the correspondence between the voltage value and the temperature.

The temperature sensor controller can determine that each temperature sensor module can correctly measure the temperature Tj by confirming that the temperature conversion values TREFN of the temperature sensor modules substantially coincide with each other. In one aspect, substantially coinciding means that the difference between the respective temperature conversion values TREFN is within a preset range, and the respective temperature conversion values TREFN do not necessarily have to be the same.

In another aspect, if the temperature sensor controller determines that the temperature conversion values TREFN of the respective temperature sensor modules do not coincide, the temperature sensor controller can determine that the temperature sensor module 430 or the temperature sensor module 440 cannot correctly measure the temperature Tj (i.e., that there is a possibility of failure). Incidentally, that the temperature conversion values TREFN do not coincide means that the difference between the respective temperature conversion values TREFN is not within the preset range described above.

Figure 9:
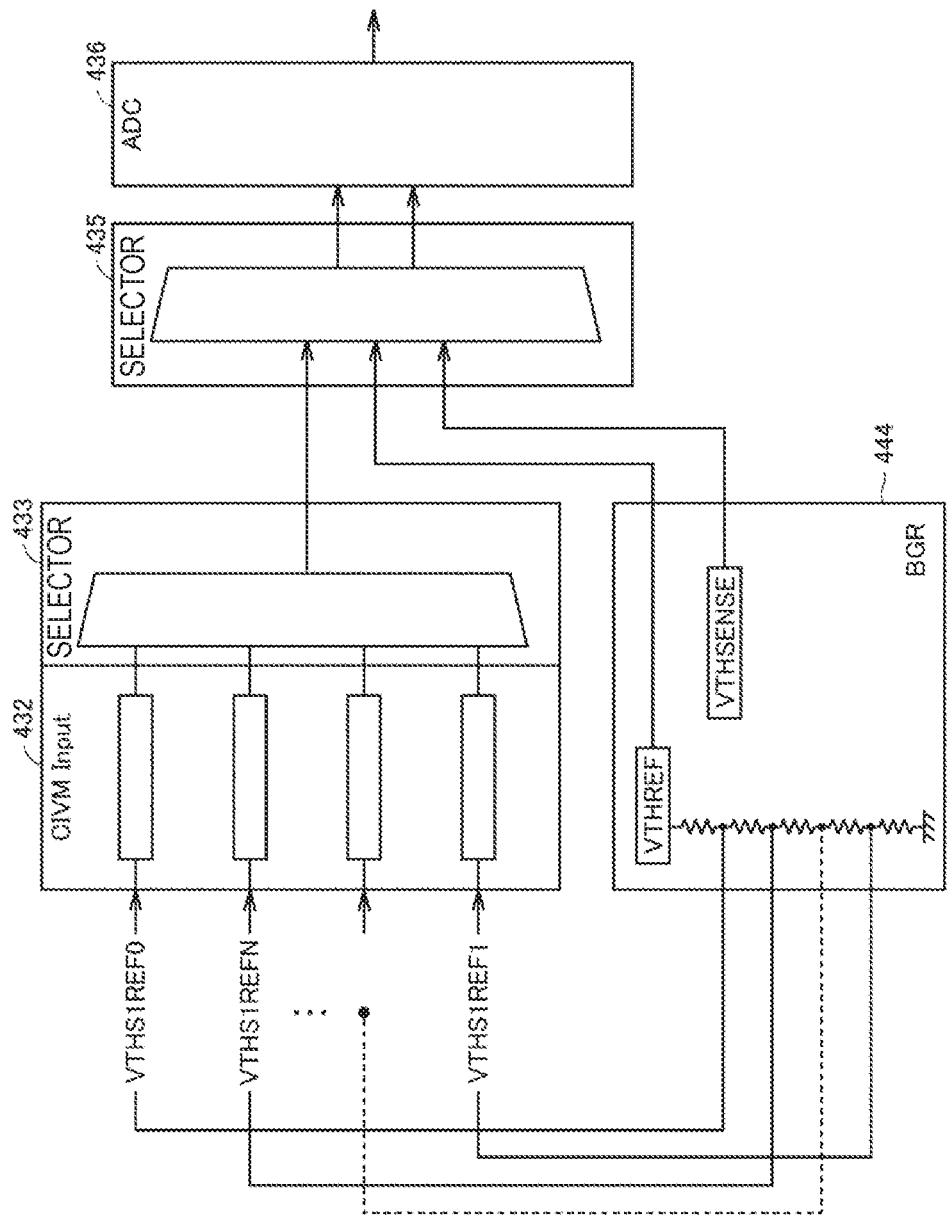
FIG. 9 is a block diagram showing a hardware configuration of a temperature sensor module 440.

A configuration of the temperature sensor module 440 will be described with reference to FIGS. 9 and 10. FIG. 9 is a block diagram showing a hardware configuration of the temperature sensor module 440. As shown in FIG. 9, the temperature sensor module 440 includes the voltage input unit 432, the selector 433, the BGR circuit 444, the selector 435, and the ADC 436.

The BGR circuit 444 divides the reference voltage VTHREF by resistors to generate the voltage values VTHS1REF0 to VTHS1REFN. Since each voltage is generated based on a resistance ratio in the semiconductor, each voltage ratio does not change even if there are manufacturing variations in the resistance of the semiconductor. For this reason, it can be expected that the ratios between the temperature conversion values TREFN of the temperature sensor modules (e.g., a ratio between the temperature conversion value TREF0 obtained in the step S690 and the temperature conversion value TREF1 obtained in the step S790) coincide with each other. Thus, it can be confirmed that the performance and the function of the temperature sensor module operate as expected.

On the other hand, for example, when only the temperature conversion value TREF0 (step S690) is obtained, and there is an error in processing results of each temperature sensor module, if the error is small, the performance of the temperature sensor module can be confirmed, but if the error is large, it is difficult to confirm the performance of the temperature sensor module. The error handled here refers to an offset error and a load difference error of a circuit system. When the temperature sensor controller uses, for example, two values of the temperature conversion value TREF0 (step S690) and the temperature conversion value TREF1 (step S790), the offset error and the load difference error of the circuit system are canceled with respect to the difference and the ratio, so that the performance of the temperature sensor module can be easily confirmed.

Next, referring to FIG. 10, an example in which the reference voltage VTHREF of the BGR circuit 444 of the temperature sensor module 440 is divided by resistors to generate the voltage values VTHS1REF0 to VTHS1REFN will be described. FIG. 10 is a diagram showing electrical characteristics of the BGR circuit 444 of the temperature sensor module 440.

First, in one aspect, the voltage value VTHS1REF0 is set as the PTAT voltage VTHSENSE corresponding to the upper limit temperature (e.g., 125° C.) at which the operation of the semiconductor device is guaranteed. Further, the voltage value VTHS1REF1 is set as the PTAT voltage VTHSENSE corresponding to the lower limit temperature (e.g., −40° C.) at which the operation of the semiconductor device 400 is guaranteed. Furthermore, for example, an arbitrary number of voltage values VTHS1REFN obtained by equally dividing the intermediate voltage between the voltage value VTHS1REF0 and the voltage value VTHS1REF1 are set as the PTAT voltage VTHSENSE corresponding to the temperature within the range in which the operation of the semiconductor device 400 is guaranteed. In this manner, the functionality and performance of the semiconductor device 400 can be tested within the range in which the operation of the semiconductor device 400 is guaranteed.

In another aspect, three or more temperature sensor modules may measure the temperature conversion value TREF0 (step S690) and the temperature conversion value TREF1 (step S790). Note that three or more temperature sensor modules may further measure the temperature conversion value TREFN (step S890). In such a case, if all the temperature sensor modules measure approximately the same value, the temperature sensor controller can determine that the measured values of the temperatures Tj of all the temperature sensor modules are correct.

Of the three or more temperature sensor modules, when two or more temperature sensor modules including the temperature sensor module 440 measure approximately the same temperature Tj and the other temperature sensor modules measure different temperatures Tj, the temperature sensor controller can determine that the temperature sensor module measuring the temperature Tj different from the temperature Tj measured by the temperature sensor module 440 has failed. The failure of the temperature sensor module 440 can be confirmed if the ratio between the temperature conversion values TREFN (step S890) of the temperature sensor modules (for example, the ratio between the temperature conversion value TREF0 and the temperature conversion value TREF1) does not coincide with an expected value.

When two temperature sensor modules are adjacent to each other as in the temperature sensor module 110 and the temperature sensor module 111 in FIG. 3, since the temperature Tj of the temperature sensor module 110 and the temperature Tj of the temperature sensor module 111 substantially coincide with each other, it can be confirmed that the respective voltage values (the reference voltage VTHREF, the PTAT voltage VTHSENSE and the voltage values VTHS1REF0 to VTHS1REFN) of the temperature sensor module 110 are approximately the same as the respective voltage values (the reference voltage VTHREF, the PTAT voltage VTHSENSE and the voltage values VTHS1REF0 to VTHS1REFN) of the temperature sensor module 111. If all of the respective measured values of the temperature sensor module 110 described above are approximately the same as all of the respective measured values of the temperature sensor module 111 described above, it can be determined that the temperature sensor module 110 and the temperature sensor module 111 are operating correctly. On the other hand, if all of the respective measured values of the temperature sensor module 110 described above are not approximately the same as all of the respective measured values of the temperature sensor module 111 described above, it means that either the temperature sensor module 110 or the temperature sensor module 111 has failed. In ASIL tests, this is determined to be a failure.

The temperature sensor module 110 performs aged degradation correction processing for correcting offsets caused by aged degradation. In the measurement by "approximately the same" described above, a value after the aged degradation correction processing is performed by the temperature sensor module 101 is used. In addition, because the temperature sensor module 110 is suspended when the semiconductor device equipped with the temperature sensor module 110 is normally used, by performing an operation check of the temperature sensor module 110 in shipping tests of the semiconductor device, it can be confirmed that the respective operation characteristics of the temperature sensor module 110 and the temperature sensor module 111 are maintained at the same level. If a failure of the temperature sensor module occurs in terms of function, the measured value may be a fixed value due to being fixed to GND, Vcc (positive power supply voltage) or other potential, or may be an indefinite value due to open state. Therefore, such a failure can be judged from the measurement results.

As described above, although there may be some differences in the characteristics of the BGR circuits of the respective temperature sensor modules, by confirming that the temperature conversion values TREF0, TREF1 and TREFN of the respective temperature sensor modules approximately coincide with each other, the respective temperature sensor modules can correctly measure the temperature Tj within the temperature ranges in which the operation of the semiconductor device 400 is guaranteed.

Figure 10:
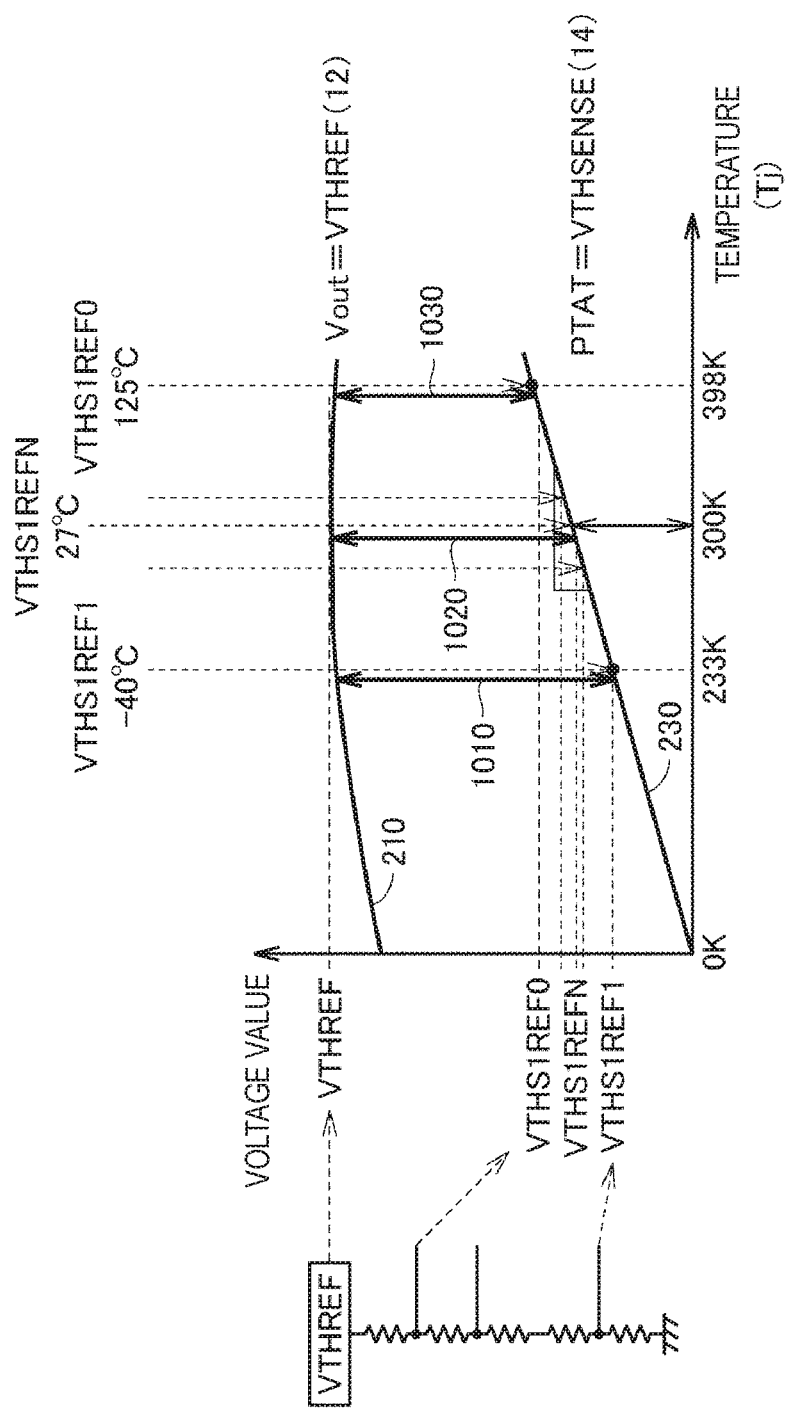
FIG. 10 is a diagram showing electrical characteristics of a BGR circuit 444 of a temperature sensor module 440.

Also, because the voltage values VTHS1REF0 to VTHS1REFN of the temperature sensor module 440 shown in FIG. 4, as shown in FIG. 10, are the values obtained by dividing the reference voltage VTHREF of the BGR circuit 444 with the resistors, it can be expected to be stably obtained approximately the same value even if the measurement is repeated several times. It is also possible to confirm that the measurement can be correctly performed at the moment of the measurement during testing, which is another requirement of the ASIL D.

Second Embodiment

Hereinafter, a second embodiment will be described. In the present embodiment, a test method is described when one or two thermal sensor modules are mounted on a semiconductor device.

Figure 11:
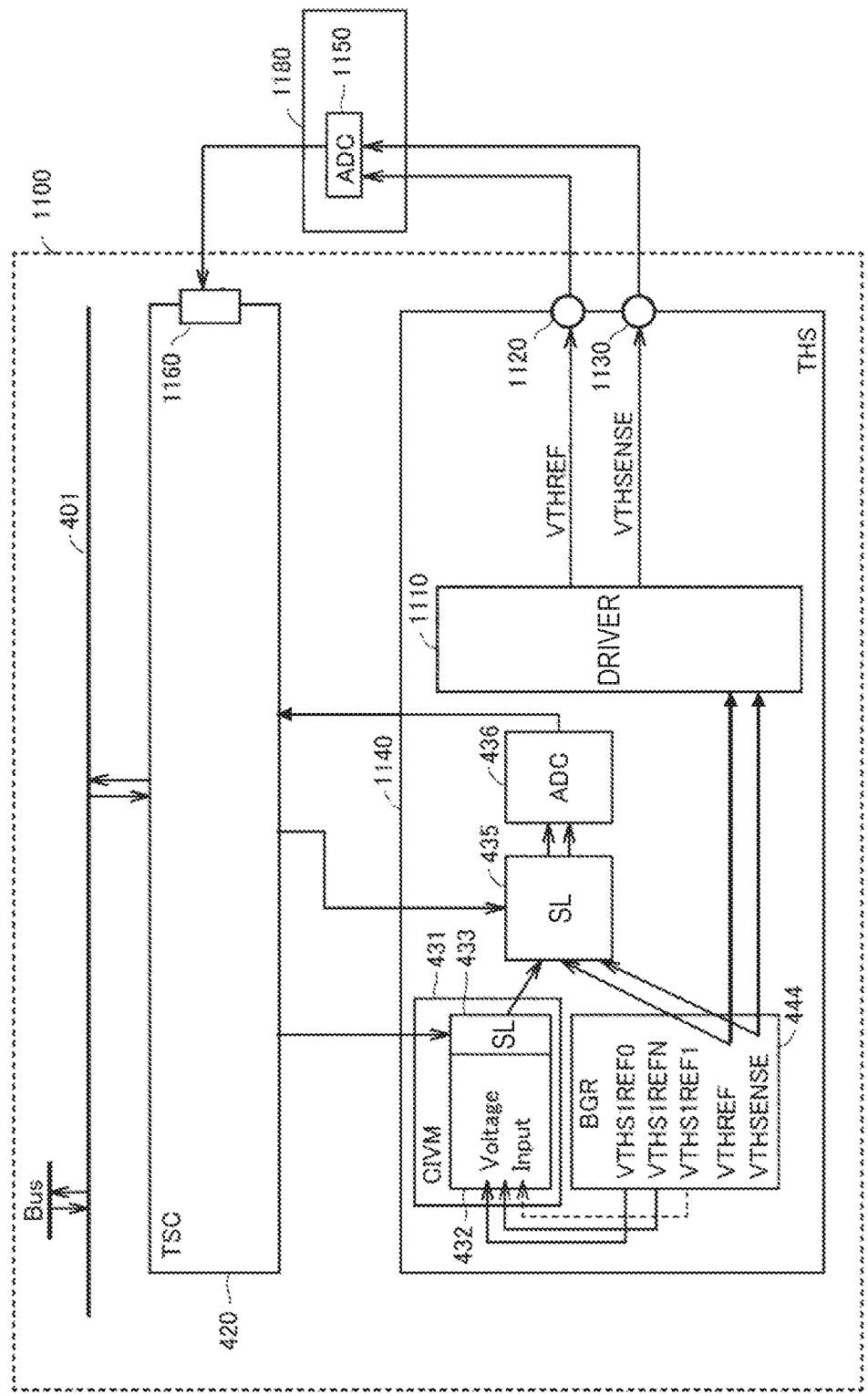
FIG. 11 is a block diagram showing a hardware configuration of a semiconductor device 1100 including a single temperature sensor module.

First, referring to FIG. 11, a configuration of a semiconductor device 1100 will be described. FIG. 11 is a block diagram showing a hardware configuration of the semiconductor device 1100 including a single temperature sensor module. The semiconductor device 1100 includes a temperature sensor module 1140 and a temperature sensor controller 420 connected to an external system 1180. In addition to the configuration of the temperature sensor module 440, the temperature sensor module 1140 further includes a driver 1110, and output terminals 1120 and 1130.

The drivers 1110 output the reference voltage VTHREF and the PTAT voltage VTHSENSE to the outside of the temperature sensor module 1140 via the output terminals 1120 and 1130. The reference voltage VTHREF and the PTAT voltage VTHSENSE output to the outside are input to the external system 1180. In one aspect, the external system 1180 is a tester for each temperature sensor module and is configured to receive signals output from each temperature sensor module. In another aspect, an external system may be used for each temperature sensor module.

In the external system 1180, the ADC 1150 performs the AD conversion processing on the PTAT voltage VTHSENSE based on the reference voltage VTHREF. The temperature sensor controller 420 receives the obtained digital value by the AD conversion processing via a digital terminal 1160.

Figure 12:
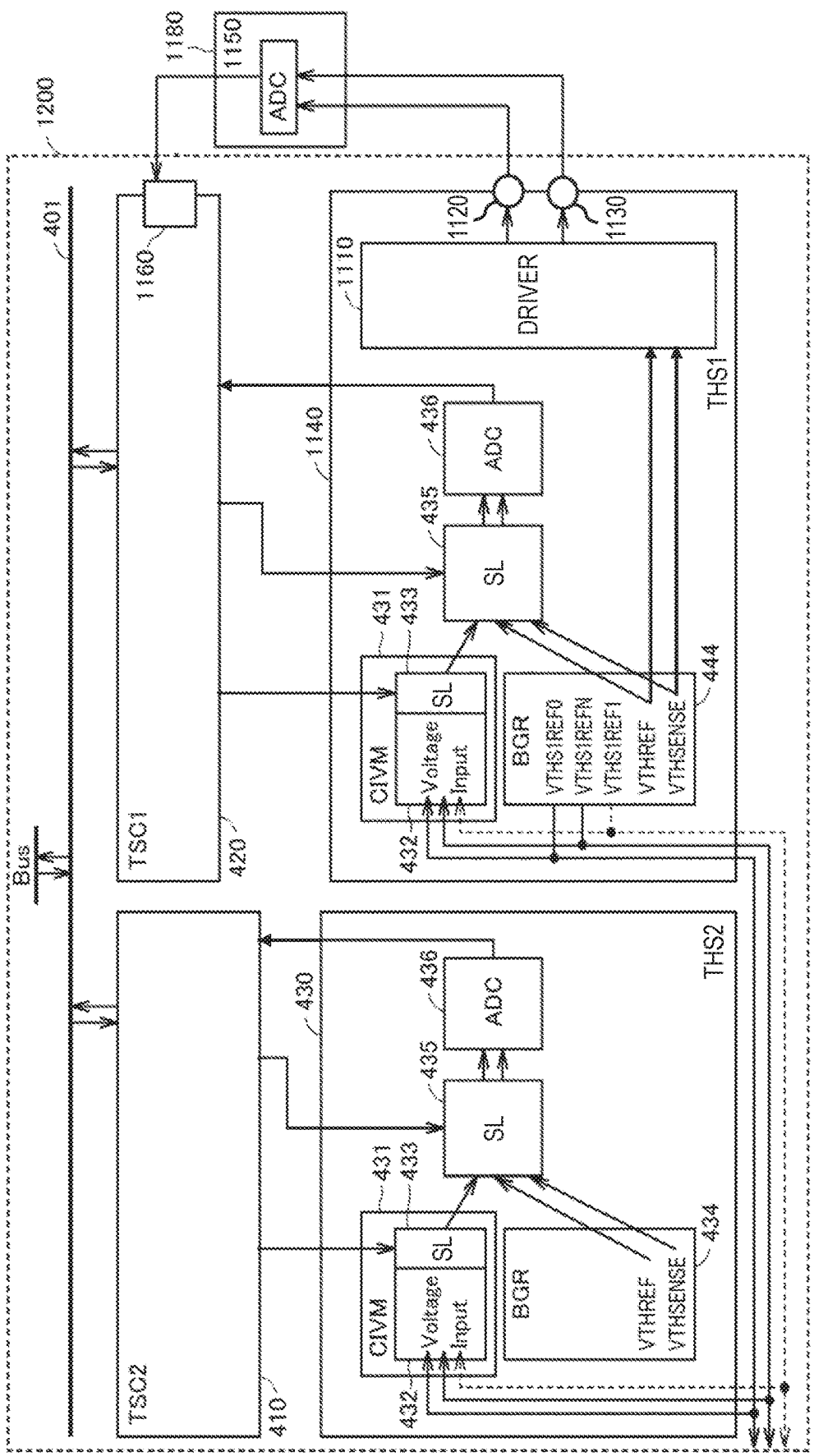
FIG. 12 is a block diagram showing a hardware configuration of a semiconductor device 1200 including two temperature sensor modules.

FIG. 12 is a block diagram showing a hardware configuration of a semiconductor device 1200 including two temperature sensor modules. The semiconductor device 1200 includes the temperature sensor modules 430 and 1140, and the temperature sensor controllers 410 and 420. The temperature sensor module 1140 includes the output terminals 1120 and 1130. The temperature sensor module 1140 and the temperature sensor controller 420 are connected to the external system 1180. The connections of the components and the input/output relationships of the signals in the semiconductor device 1200 shown in FIG. 12 are the same as those shown in FIG. 4. Therefore, these descriptions will not be repeated.

Figure 13:
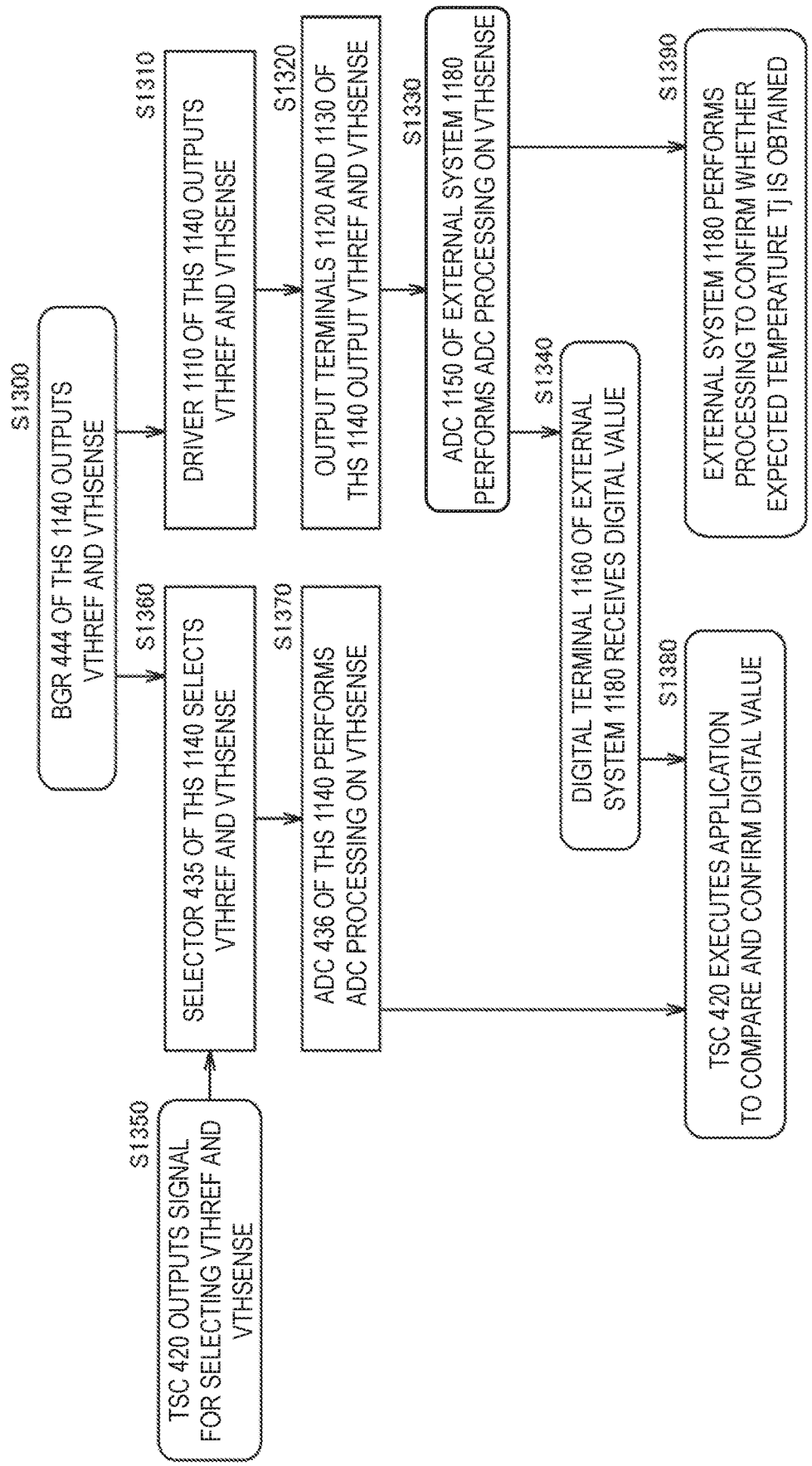
FIG. 13 is a flowchart showing a part of processing performed by the semiconductor device 1100.

Referring to FIG. 13, a control method of the semiconductor device will be described. FIG. 13 is a flowchart showing a part of processing performed by the semiconductor device 1100.

In a step S1300, the BGR circuit 444 of the temperature sensor module 1140 outputs the reference voltage VTHREF and the PTAT voltage VTHSENSE.

In a step S1310, the driver 1110 outputs the analog values of the reference voltage VTHREF and the PTAT voltage VTHSENSE to the output terminals 1120 and 1130, respectively.

In a step S1320, the output terminals 1120 and 1130 output the analog values of the reference voltage VTHREF and the analog values of the PTAT voltage VTHSENSE to the external system 1180.

At a step S1330, in the external system 1180, the ADC 1150 performs the AD conversion processing on the PTAT voltage VTHSENSE based on the reference voltage VTHREF. The digital value obtained by the AD conversion is sent from the external system 1180 to the temperature sensor controller 420.

In a step S1340, the digital terminal 1160 receives the digital value output from the ADC 1150.

In a step S1350, the temperature sensor controller 420 outputs the signal for selecting the reference voltage VTHREF and the PTAT voltage VTHSENSE to the temperature sensor module 1040.

In a step S1360, the selector 435 selects the reference voltage VTHREF and the PTAT voltage VTHSENSE in response to the reception of the signal.

In a step S1370, the ADC 436 performs the AD conversion processing on the PTAT voltage value VTHSENSE based on the reference voltage VTHREF. The digital value obtained by the AD conversion is output to the temperature sensor controller 420.

In a step S1380, the temperature sensor controller 420 executes an application program and compares the digital value from the external system 1180 with the digital value from the temperature sensor module 1140 to confirm whether the digital values are approximately the same.

In a step S1390, the external system 1180 performs preliminarily prepared processing for testing using the digital value obtained by the ADC 1150 to confirm whether an expected temperature Tj is obtained.

According to the configuration shown in FIG. 11, it is possible to confirm whether or not the BGR circuit 444 is operating normally by a system outside the semiconductor device 1100, such as the external system 1180. The temperature sensor controller 420 compares the digital value obtained by performing the AD conversion processing on the output value of the BGR circuit 444 by the ADC 436 and the digital value obtained by performing the AD conversion processing on the output value of the BGR circuit 444 by the ADC 1150. The semiconductor device 1100 confirms whether these digital values are approximately the same value. If these digital values are approximately the same value, the temperature sensor controller 420 can confirm that the ADC 436 is operating normally.

Since the voltage values VTHS1REF0 to VTHS1REFN are obtained by dividing the reference voltage VTHREF with the resistors in the BGR circuit 444, it is possible to estimate the voltage values VTHS1REF0 to VTHS1REFN based on the reference voltage VTHREF. For this reason, the semiconductor device 1100 can confirm whether or not the voltage values VTHS1REF0 to VTHS1REFN are expected values by performing the AD conversion processing on the voltage values VTHS1REF0 to VTHS1REFN which are selected by the selector 435 via the CIVM circuit 431. In this manner, the semiconductor device 1100 can confirm that the entire circuit system of the temperature sensor module 1140 is operating normally.

Figure 14:
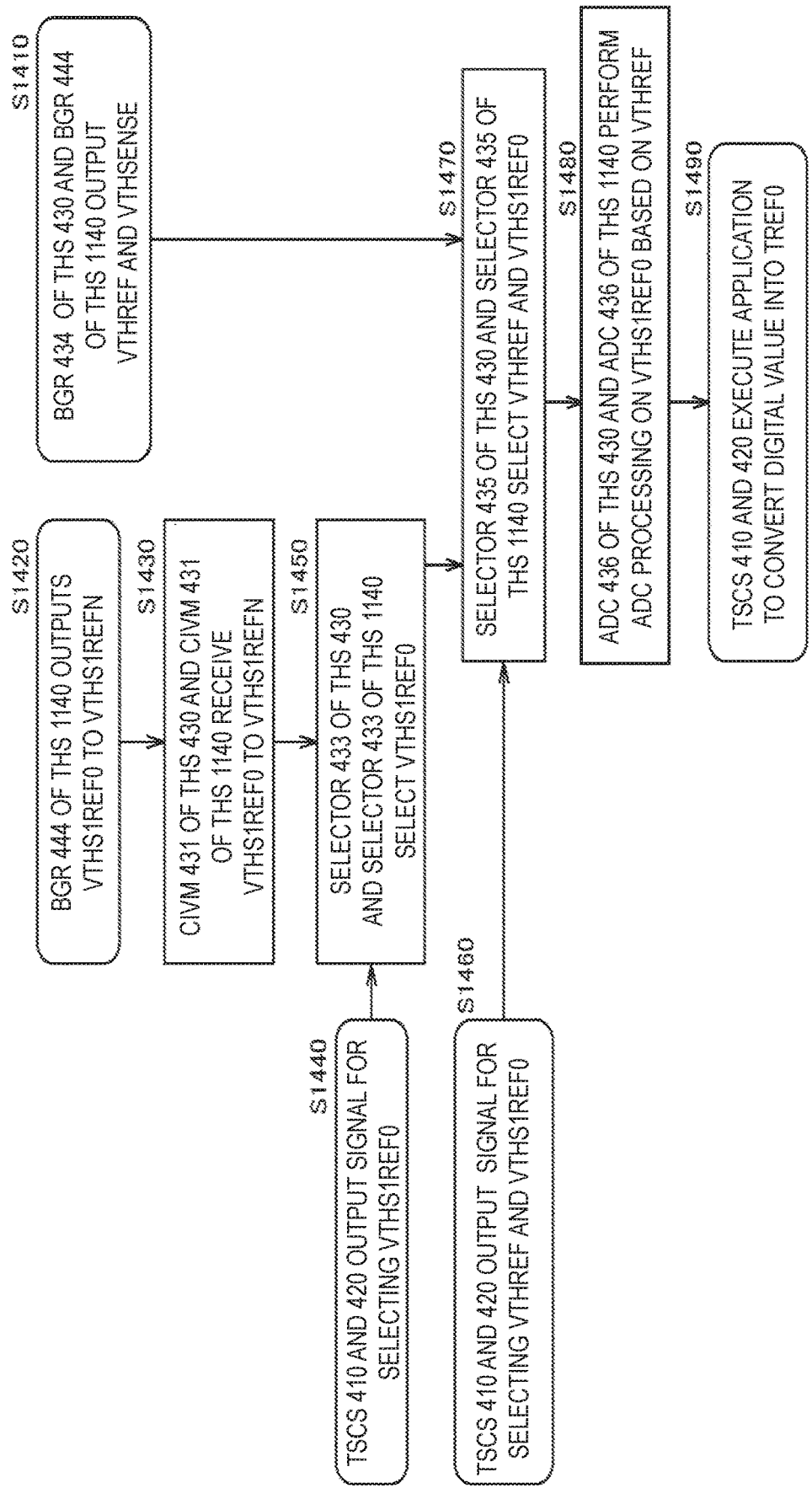
FIG. 14 is a flowchart showing a part of processing by the semiconductor device 1200.

Next, referring to FIG. 14, a control method of the semiconductor device 1200 will be described. FIG. 14 is a flowchart showing a part of processing by the semiconductor device 1200. The processing shown in FIG. 14 is performed to confirm that the temperature Tj is accurately measured by the temperature sensor module 430 after confirming that the temperature Tj is accurately measured by the temperature sensor module 1140 in the processing shown in FIG. 13.

In a step S1410, the BGR circuit 434 of the temperature sensor module 430 outputs the reference voltage VTHREF and the PTAT voltage VTHSENSE to the selector 435. The BGR circuit 444 of the temperature sensor module 1140 outputs the reference voltage VTHREF and the PTAT voltage VTHSENSE.

In a step S1420, the BGR circuit 444 of the temperature sensor module 1140 outputs the voltage values VTHS1REF0 to VTHS1REFN.

In a step S1430, the CIVM circuit 431 of the temperature sensor module 430 and the CIVM circuit 431 of the temperature sensor module 1140 receive the voltage values VTHS1REF0 to VTHS1REFN output from the BGR circuit 444, respectively.

In a step S1440, the temperature sensor controllers 410 and 420 output the signal for selecting the voltage value VTHS1REF0 to the temperature sensor modules 430 and 1140, respectively.

In a step S1450, the selector 433 of the CIVM circuit 431 of the temperature sensor module 430 and the selector 433 of the CIVM circuit 431 of the temperature sensor module 1140 select the voltage value VTHS1REF0 in response to the reception of the signal, respectively.

In a step S1460, the temperature sensor controllers 410 and 420 output the signal for selecting the reference voltage VTHREF and the voltage value VTHS1REF0 to the temperature sensor modules 430 and 1140, respectively.

In a step S1470, the selector 435 of the temperature sensor module 430 and the selector 435 of the temperature sensor module 1140 select, in response to the reception of the signal, the reference voltage VTHREF and the voltage value VTHS1REF0, respectively.

In a step S1480, the ADC 436 of the temperature sensor module 430 and the ADC 436 of the temperature sensor module 1140 perform the AD conversion processing on the voltage value VTHS1REF0 based on the reference voltage VTHREF, respectively.

In a step S1490, the temperature sensor controllers 410 and 420 execute the application program to convert the digital value obtained by the AD conversion into the temperature conversion value TREF0, respectively.

Since the operation of the temperature sensor module 1140 has been guaranteed in the manner shown in FIG. 13, the semiconductor device 1200 can confirm that the temperature sensor module 430 can accurately measure the temperature Tj by confirming that the temperature conversion value TREF0 calculated by the temperature sensor controller 410 and the temperature conversion value TREF0 calculated by the temperature sensor controller 420 are approximately the same value.

Figure 15:
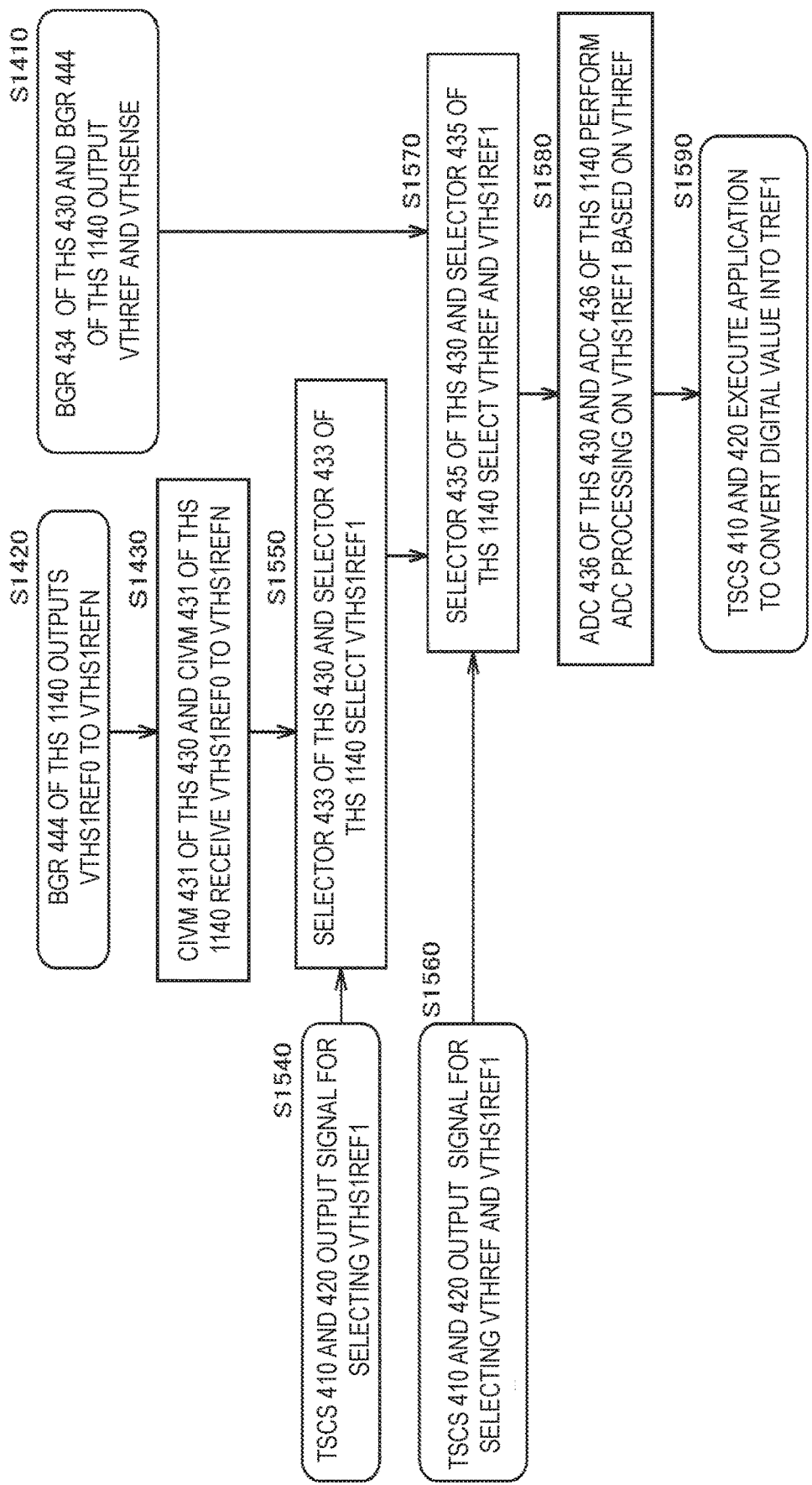
FIG. 15 is a flowchart showing a part of processing performed by the semiconductor device 1200 according to another aspect.

Next, another aspect will be further described with reference to FIG. 15. FIG. 15 is a flowchart showing a part of processing performed by the semiconductor device 1200 according to another aspect. The processing shown in FIG. 15 is performed to confirm that the temperature Tj is accurately measured by the temperature sensor module 430 after confirming that the temperature Tj is accurately measured by the temperature sensor module 1140 in the processing shown in FIG. 13. The same processing as that described above is denoted by the same step number. Therefore, the description of the same processing will not be repeated.

In a step S1540, the temperature sensor controllers 410 and 420 output the signal for selecting the voltage value VTHS1REF1 to the temperature sensor modules 430 and 1140, respectively.

In a step S1550, the selector 433 of the CIVM circuit 431 of the temperature sensor module 430 and the selector 433 of the CIVM circuit 431 of the temperature sensor module 1140 select the voltage value VTHS1REF1 in response to the reception of the signal, respectively.

In a step S1560, the temperature sensor controllers 410 and 420 output the signal for selecting the reference voltage VTHREF and the voltage value VTHS1REF1 to the temperature sensor modules 430 and 1140, respectively.

In a step S1570, the selector 435 of the temperature sensor module 430 and the selector 435 of the temperature sensor module 1140 select, in response to the reception of the signal, the reference voltage VTHREF and the voltage value VTHS1REF1, respectively.

In a step S1580, the ADC 436 of the temperature sensor module 430 and the ADC 436 of the temperature sensor module 1140 perform the AD conversion processing on the voltage value VTHS1REF1 based on the reference voltage VTHREF, respectively.

In a step S1590, the temperature sensor controllers 410 and 420 execute the application program to convert the digital value obtained by the AD conversion into the temperature conversion value TREF1, respectively.

Since the operation of the temperature sensor module 1140 has been guaranteed in the manner shown in FIG. 13, the semiconductor device 1200 can confirm that the temperature sensor module 430 can accurately measure the temperature Tj by confirming that the temperature conversion value TREF1 calculated by the temperature sensor controller 410 and the temperature conversion value TREF1 calculated by the temperature sensor controller 420 are approximately the same value.

Figure 16:
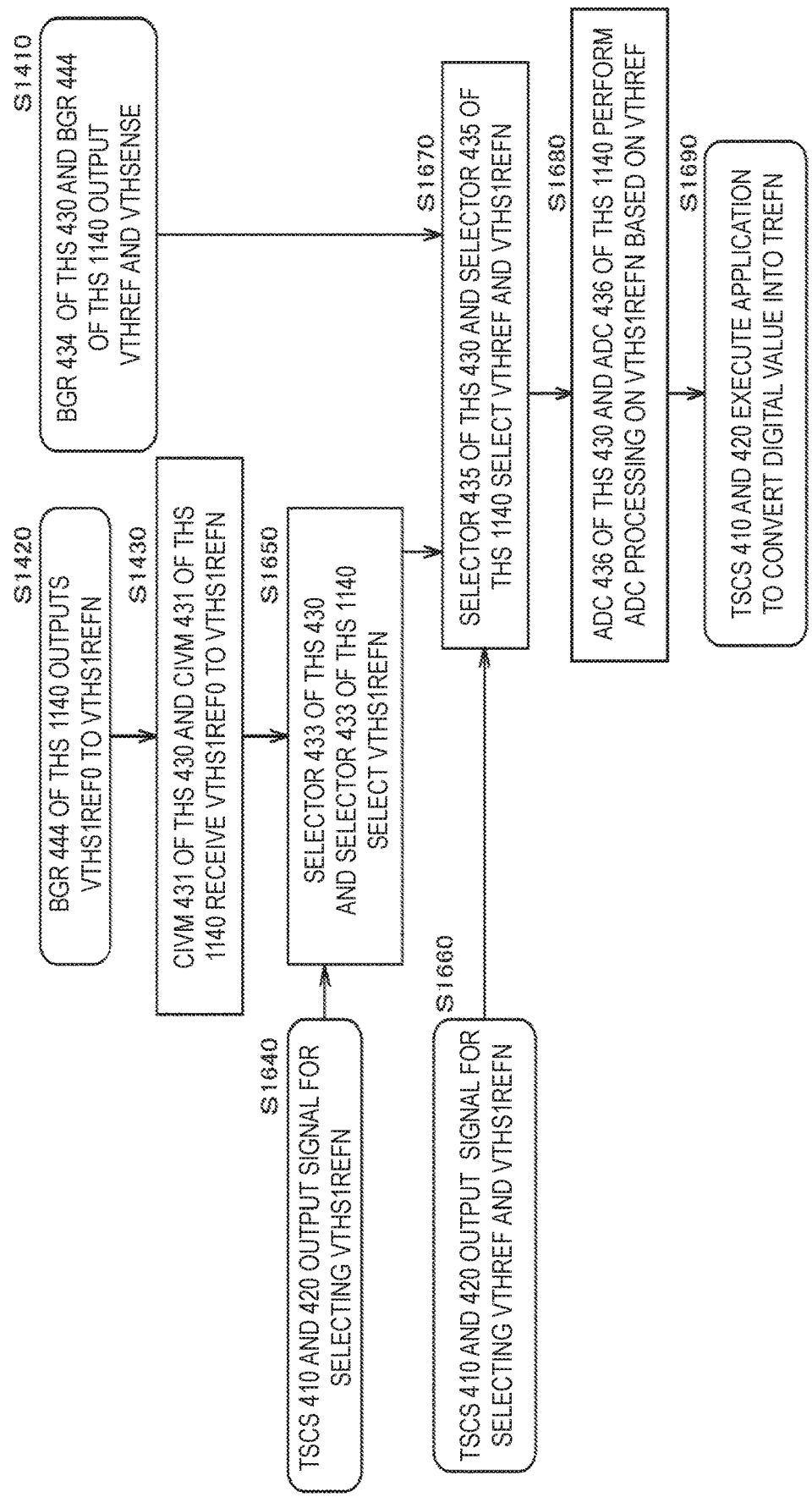
FIG. 16 is a flowchart showing a part of processing performed by the semiconductor device 1200 according to yet another aspect.

Yet another aspect will be described with reference to FIG. 16. FIG. 16 is a flowchart showing a part of processing performed by the semiconductor device 1200 according to yet another aspect. The processing shown in FIG. 16 is performed to confirm that the temperature Tj is accurately measured by the temperature sensor module 430 after confirming that the temperature Tj is accurately measured by the temperature sensor module 1140 in the processing shown in FIG. 13. The same processing as that described above is denoted by the same step number. Therefore, the description of the same processing will not be repeated.

In a step S1640, the temperature sensor controllers 410 and 420 output the signal for selecting the voltage value VTHS1REFN to the temperature sensor modules 430 and 1140, respectively.

In a step S1650, the selector 433 of the CIVM circuit 431 of the temperature sensor module 430 and the selector 433 of the CIVM circuit 431 of the temperature sensor module 1140 select the voltage value VTHS1REFN in response to the reception of the signal, respectively.

In a step S1660, the temperature sensor controllers 410 and 420 output the signal for selecting the reference voltage VTHREF and the voltage value VTHS1REFN to the temperature sensor modules 430 and 1140, respectively.

In a step S1670, the selector 435 of the temperature sensor module 430 and the selector 435 of the temperature sensor module 1140 select, in response to the reception of the signal, the reference voltage VTHREF and the voltage value VTHS1REFN, respectively.

In a step S1680, the ADC 436 of the temperature sensor module 430 and the ADC 436 of the temperature sensor module 1140 perform the AD conversion processing on the voltage value VTHS1REFN based on the reference voltage VTHREF, respectively.

In a step S1690, the temperature sensor controllers 410 and 420 execute the application program to convert the digital value obtained by the AD conversion into the temperature conversion value TREFN, respectively.

Since the operation of the temperature sensor module 1140 has been guaranteed in the manner shown in FIG. 13, the semiconductor device 1200 can confirm that the temperature sensor module 430 can accurately measure the temperature Tj by confirming that the temperature conversion value TREFN calculated by the temperature sensor controller 410 and the temperature conversion value TREFN calculated by the temperature sensor controller 420 are approximately the same value.

Since each of the temperature conversion values TREF0, TREF1 and TREFN corresponds to the temperature range in which the operation of the semiconductor device 1200 is guaranteed, by confirming that the temperature conversion values TREF0, TREF1 and TREFN of the respective temperature sensor modules approximately coincide with each other, it can be determined that the respective temperature sensor modules can measure the temperature Tj within the temperature range in which the operation of the semiconductor device 1200 is guaranteed.

In yet another aspect, the temperature sensor module 430 can be increased by any number in the same manner as the temperature sensor module 430 according to the second embodiment. That is, the first embodiment and the second embodiment can be appropriately combined.

Third Embodiment

Hereinafter, a third embodiment will be described. A semiconductor device 1700 according to the present embodiment differs from the semiconductor device according to each of the above-described embodiments in that each of the temperature sensor modules includes the output terminals 1120 and 1130.

Figure 17:
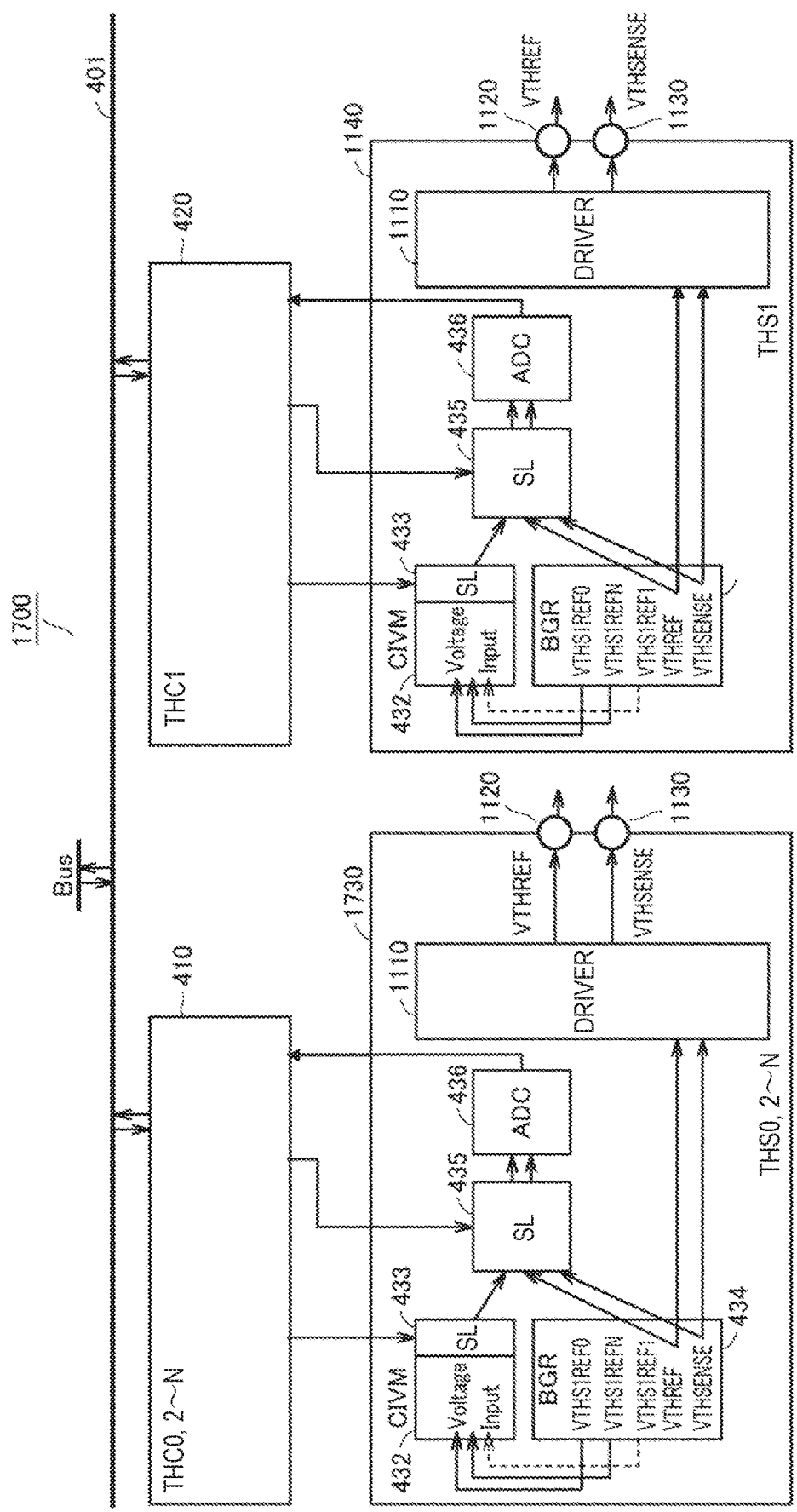
FIG. 17 is a block diagram showing a hardware configuration of a semiconductor device 1700.

Referring to FIG. 17, a configuration of the semiconductor device 1700 according to the present embodiment will be described. FIG. 17 is a block diagram showing a hardware configuration of the semiconductor device 1700. The semiconductor device 1700 includes the N temperature sensor controllers 410, the temperature sensor controller 420, N temperature sensor modules 1730, and a temperature sensor module 1040. Each temperature sensor module 1730 is connected to each temperature sensor controller 410.

According to the configuration shown in FIG. 17, similar to the temperature sensor module 1140, each temperature sensor module 1730 can output the reference voltage VTHREF and the PTAT voltage VTHSENSE via the output terminals 1120 and 1130. Therefore, even if the voltage values VTHS1REF0 to VTHS1REFN are not supplied from the temperature sensor module 1140 to each temperature sensor module 1730, each temperature sensor module 1730 can perform the test as described in the second embodiment.

Fourth Embodiment

Hereinafter, a fourth embodiment will be described. In the above-described embodiments, the AD conversion is performed based on the reference voltage VTHREF, but a voltage other than the reference voltage may be used.

Referring back to FIG. 4, the present embodiment will be described. As shown in FIG. 4, the selector 435 of the temperature sensor module 430 may select the PTAT voltage VTHSENSE output from the BGR circuit 434. Thus, the ADC 436 of the temperature sensor module 430 may performs the AD conversion processing on the voltage values VTHS1REF0 to VTHS1REFN of the BGR circuit 444 of the temperature sensor module 440 based on the PTAT voltage VTHSENSE of the BGR circuit 434 of the temperature sensor module 430.

Here, the ADCs 436 of the temperature sensor modules 430 and 440 perform the following AD conversion processing.

(A) The ADC 436 performs the AD conversion processing on the voltage values VTHS1REF0 to VTHS1REFN based on the reference voltage VTHREF.

(B) The ADC 436 performs the AD conversion processing on the voltage values VTHS1REF0 to VTHS1REFN based on the PTAT voltage VTHSENSE.

(C) The ADC 436 performs the AD conversion processing on the PTAT voltage VTHSENSE based on the reference voltage VTHREF.

The temperature sensor controller 420 can estimate a value corresponding to a conversion result of (C) (a value without considering input/output offset of the CIVM circuit 431: an ideal value) using conversion results of (A) and (B). In this instance, a difference between the conversion result of (C) and the ideal value corresponds to the input/output offset of the CIVM circuit 431. Even if the temperature sensor modules 430 and 440 are included in the same semiconductor device, the input/output offsets of the CIVM circuits 431 of the respective temperature sensor modules 430 and 440 may be different. By adjusting input/output characteristics of CIVM circuits based on the offsets obtained in this manner, it is possible to perform temperature measurement with high accuracy by the temperature sensor modules according to the above-mentioned embodiments.

Figure 18:
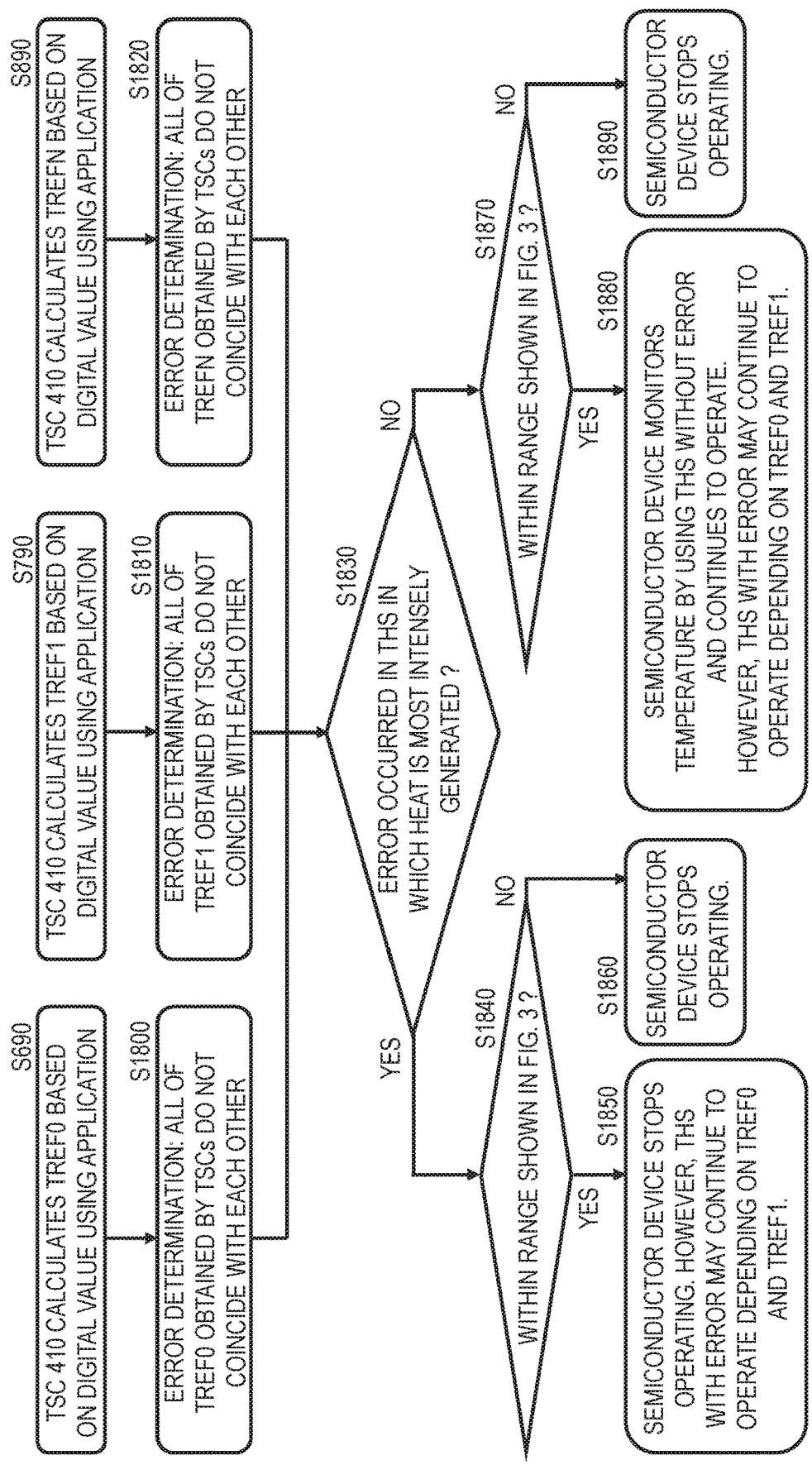
FIG. 18 is a flowchart showing a part of processing when an error (failure) is detected based on results of a test exemplified in each of the above-mentioned embodiment.

Yet another aspect will be described with reference to FIG. 18. FIG. 18 is a flowchart showing a part of processing when an error (failure) is detected based on the results of the test exemplified in each of the above-described embodiments. The same processing as that described above is denoted by the same step number. Therefore, the description of the same processing will not be repeated.

In a step S1800, the temperature sensor controller performs error determination. For example, when all of the temperature conversion values TREF0 obtained by the N+1 temperature sensor controllers do not coincide with each other, the temperature sensor controller determines that errors have occurred in the semiconductor device.

In a step S1810, the temperature sensor controller performs error determination. For example, when all of the temperature conversion values TREF1 obtained by the N+1 temperature sensor controllers do not coincide with each other, the temperature sensor controller determines that errors have occurred in the semiconductor device.

In a step S1820, the temperature sensor controller performs error determination. For example, when all of the temperature conversion values TREFN obtained by the N+1 temperature sensor controllers do not coincide with each other, the temperature sensor controller determines that errors have occurred in the semiconductor device.

At a step S1830, the temperature sensor controller determines whether the error has occurred in the temperature sensor module which is disposed at the place where heat is most intensely generated in the semiconductor device (for example, the temperature sensor modules 112 and 113 shown in FIG. 3). This determination is made based on, for example, results of comparing the voltage values output from the respective temperature sensor modules. If the error has occurred in the temperature sensor module which is disposed at the place where heat is most intensely generated (YES in step S1830), the processing proceeds to a step S1840. Otherwise (NO in step S1830), the processing proceeds to a step S1870.

In a step S1840, the temperature sensor controller determines the extent of the error of the temperature sensor module in which the error has occurred. This determination is made based on, for example, whether or not the output values from the temperature sensor module fall within the range shown in FIG. 3. If at least a part of the output values from the temperature sensor module falls within the range shown in FIG. 3 (YES in step S1840), the processing proceeds to a step S1850. Otherwise (NO in step S1840), the processing proceeds to a step S1860.

In step S1850, the semiconductor device stops operating regardless of an execution situation of an application program. However, when the output values, corresponding to the temperature conversion values TREF0 and TREF1, from the temperature sensor module in which the error has occurred, fall within the range shown in FIG. 3, this temperature sensor module may continue to operate for the importance attached to safety.

In step S1860, the semiconductor device stops operating regardless of an execution situation of an application program.

In step S1870, the temperature sensor controller determines the extent of the error of the temperature sensor module in which the error has occurred. This determination is made based on, for example, whether or not the output values from the temperature sensor module fall within the range shown in FIG. 3. If at least a part of the output values from the temperature sensor module falls within the range shown in FIG. 3 (YES in step S1870), the processing proceeds to a step S1880. Otherwise (NO in step S1870), the processing proceeds to a step S1890.

In step S1880, the semiconductor device monitors the temperature Tj by using a temperature sensor module other than the temperature sensor module in which the error has occurred, according to an execution situation of an application program, and continues to operate. However, when the output values, corresponding to the temperature conversion values TREF0 and TREF1, from the temperature sensor module in which the error has occurred, fall within the range shown in FIG. 3, this temperature sensor module may continue to operate for the importance attached to safety.

In step S1890, the semiconductor device stops operating regardless of an execution situation of an application program.

As described above, according to the present disclosure, in the semiconductor device including a plurality of temperature sensor modules, in a situation where the temperature Tj measured by each temperature sensor module is unknown, it is possible to test whether or not the temperature Tj can be correctly measured. In addition, according to the present disclosure, compliance with functional safety standards (e.g., ISO26262 ASIL) for temperature sensors in semiconductor devices can also be achieved.

Although the invention made by the present inventors has been specifically described based on the embodiments, it is needless to say that the present invention is not limited to the above-described embodiments, and various changes may be made without departing from the scope thereof.

What is claimed is:

1. A semiconductor device comprising:
   a first temperature sensor module;
   a second temperature sensor module; and
   a temperature sensor controller including:
      a first temperature sensor controller that is coupled to the first temperature sensor module; and
      a second temperature sensor controller that is coupled to the second temperature sensor module,
   wherein the first temperature sensor module comprises:
      a first bandgap reference circuit that outputs a first reference voltage and a plurality of divided voltages generated by dividing the first reference voltage with resistors;
      a first selecting circuit that is coupled to the first bandgap reference circuit, and selects, based on an instruction from the first temperature sensor controller, one of the plurality of divided voltage as a first divided voltage; and
      a first conversion circuit that performs analog-to-digital conversion processing on the first divided voltage based on the first reference voltage to generate a first digital value,
   wherein the second temperature sensor module comprises:
      a second bandgap reference circuit that outputs a second reference voltage;
      a second selecting circuit that receives the plurality of divided voltages output from the first bandgap reference circuit, and selects, based on an instruction from the second temperature sensor controller, the one of the plurality of divided voltage as a second divided voltage; and
      a second conversion circuit that performs analog-to-digital conversion processing on the second divided voltage based on the second reference voltage to generate a second digital value,
   wherein the first temperature sensor controller converts the first digital value to a first temperature using a preset relationship,
   wherein the second temperature sensor controller converts the second digital value to a second temperature using the preset relationship,
   wherein the temperature sensor controller confirms whether a difference between the first temperature and the second temperature is within a preset range, and
   wherein the temperature sensor controller determines that the first and second temperature modules operate normally based on confirming that the difference between the first temperature and the second temperature is within the preset range.

2. The semiconductor device according to claim 1, wherein the instruction from the first temperature sensor controller includes one of a divided voltage corresponding to an upper limit temperature at which an operation of the semiconductor device is guaranteed, a divided voltage corresponding to a lower limit temperature at which the operation of the semiconductor device is guaranteed, and a divided voltage corresponding to a temperature between the upper limit temperature and the lower limit temperature.

3. The semiconductor device according to claim 1,
   wherein the temperature sensor controller determines that either the first sensor module or the second sensor module is fault based on confirming that the difference is not within the preset range, and
   wherein the temperature sensor controller stops operating when a temperature sensor module disposed closer to a central processing unit or a graphics processing unit included in the semiconductor device, of the first and second temperature sensor modules is fault.

4. The semiconductor device according to claim 1,
   wherein the first bandgap reference circuit further outputs a first detection voltage depending on temperature,
   wherein the first conversion circuit performs analog-to-digital conversion processing on the first detection voltage based on the first reference voltage to generate a third digital value,
   wherein the first temperature sensor controller converts the third digital value to a third temperature using the preset relationship,
   wherein the second bandgap reference circuit further outputs a second detection voltage depending on temperature,
   wherein the second conversion circuit performs analog-to-digital conversion processing on the second detection voltage based on the second reference voltage to generate a fourth digital value, and
   wherein the first temperature sensor controller converts the fourth digital value to a fourth temperature using the preset relationship.

5. A semiconductor device comprising:
   a first temperature sensor module; and
   a temperature sensor controller including a first temperature sensor controller that is coupled to the first temperature sensor module,
   wherein the first temperature sensor module comprises:

a first bandgap reference circuit that outputs a first reference voltage and a first detection voltage depending on temperature;

a first conversion circuit that performs analog-to-digital conversion processing on the first detection voltage based on the first reference voltage to generate a first digital value; and a first output terminal that is configured to be coupled to an external system, and outputs, to the external system, the first reference voltage and the first detection voltage from the first bandgap reference circuit, the external system including a second conversion circuit for performing analog-to-digital conversion processing on the first detection voltage based on the first reference voltage to generate a second digital value, and wherein the first temperature sensor controller comprises an input terminal that receives the second digital value, compares the first digital value with the second digital value, and determines that the first conversion circuit operates normally by confirming that a difference between the first digital value and the second digital value is within a preset range.

6. The semiconductor device according to claim 5, wherein the first bandgap reference circuit further outputs a plurality of divided voltages generated by dividing the first reference voltage with resistors, wherein the first temperature sensor module further comprises a first selecting circuit that is coupled to the first bandgap reference circuit, and selects, based on an instruction from the first temperature sensor controller, one of the plurality of divided voltages as a first divided voltage, wherein the first conversion circuit performs analog-to-digital conversion processing on the first divided voltage based on the first reference voltage to generate a third digital value, wherein the semiconductor device further comprises a second temperature sensor module, wherein the temperature sensor controller further comprises a second temperature sensor controller that is coupled to the second sensor module, wherein the second sensor module comprises:
a second bandgap reference circuit that outputs a second reference voltage;
a second selecting circuit that receives the plurality of divided voltages output from the first bandgap reference circuit, and selects, based on an instruction from the second temperature sensor controller, the one of the plurality of divided voltage as a second divided voltage; and
a second conversion circuit that performs analog-to-digital conversion processing on the second divided voltage based on the second reference voltage to generate a fourth digital value, wherein the first temperature sensor controller converts the third digital value to a first temperature using a preset relationship, wherein the second temperature sensor controller converts the fourth digital value to a second temperature using the preset relationship, wherein the temperature sensor controller confirms whether a difference between the first temperature and the second temperature is within a preset range, and wherein the temperature sensor controller determines that the first and second temperature modules operate normally based on confirming that the difference between the first temperature and the second temperature is within preset range.

7. The semiconductor device according to claim 6, wherein the instruction from the first temperature sensor controller includes one of a divided voltage corresponding to an upper limit temperature at which an operation of the semiconductor device is guaranteed, a divided voltage corresponding to a lower limit temperature at which the operation of the semiconductor device is guaranteed, and a divided voltage corresponding to a temperature between the upper limit temperature and the lower limit temperature.

8. A test method of a semiconductor device that includes a first temperature sensor module including a first bandgap reference circuit and a first conversion circuit, and a second temperature sensor module including a second bandgap reference circuit and a second conversion circuit, the test method comprising:

outputting, from the first bandgap reference circuit, a first reference voltage and a plurality of divided voltages generated be dividing the first reference voltage with resistors;

selecting one of the plurality of divided voltages;

by the first conversion circuit, performing analog-to-digital conversion processing on the selected one of the plurality of divided voltages based on the first reference voltage to generate a first digital value, outputting a second reference voltage from the second bandgap reference circuit;

by the second conversion circuit, performing analog-to-digital conversion processing on the selected one of the plurality of divided voltages based on the second reference voltage to generate a second digital value, converting the first digital value to the first temperature using a preset relationship;

converting the second digital value to the second temperature using the preset relationship; and determining that the first and second temperature modules operate normally by confirming that a difference between the first temperature and the second temperature is within a preset range.

9. The method of the semiconductor device according to claim 8, wherein the semiconductor device further includes a temperature sensor controller, wherein the test method further comprises outputting an instruction from the temperature sensor module, wherein the instruction includes one of a divided voltage corresponding to an upper limit temperature at which an operation of the semiconductor device is guaranteed, a divided voltage corresponding to a lower limit temperature at which the operation of the semiconductor device is guaranteed, and a divided voltage corresponding to a temperature between the upper limit temperature and the lower limit temperature, and wherein the selecting the one of the plurality of divided voltages based on the instruction.

10. The method of the semiconductor device according to claim 8, further comprising:

determining that either the first sensor module or the second sensor module is fault by confirming that the difference is not within the preset range; and stopping an operation of the semiconductor device when a temperature sensor module disposed closer to a central processing unit or a graphics processing unit included in the semiconductor device, of the first and second temperature sensor modules is fault.

\* \* \* \* \*